US007046144B2

(12) United States Patent
Stephen-Daly et al.

(10) Patent No.: US 7,046,144 B2
(45) Date of Patent: May 16, 2006

(54) THEFT DETERRENT DEVICE FOR APPLIANCES

(76) Inventors: Paul Stephen-Daly, 3/18 Moffat Street, South Yarra, Victoria 3141 (AU); Lindsay Alfred Champion, 1 Grigg Avenue, Vermont, Victoria 3135 (AU); Charles Corneles Van Dongen, 4 Chamouni Court, Frankston, Victoria 3199 (AU); Marek Robert Wambier, 17 Watham Place, Avondale Heights, Victoria 3034 (AU)

( * ) Notice: Subject to any disclaimer, the term of this patent is extended or adjusted under 35 U.S.C. 154(b) by 446 days.

(21) Appl. No.: 10/333,999

(22) PCT Filed: Jul. 26, 2001

(86) PCT No.: PCT/AU01/00914

§ 371 (c)(1),
(2), (4) Date: Jul. 24, 2003

(87) PCT Pub. No.: WO02/11093

PCT Pub. Date: Feb. 7, 2002

(65) Prior Publication Data
US 2005/0177769 A1 Aug. 11, 2005

(30) Foreign Application Priority Data
Jul. 27, 2000 (AU) .................................... PQ9029

(51) Int. Cl.
*G08B 13/14* (2006.01)
(52) U.S. Cl. ................. 340/568.1; 340/568.2; 340/568.3
(58) Field of Classification Search ............ 340/568.1, 340/568.2, 568.3
See application file for complete search history.

(56) References Cited

U.S. PATENT DOCUMENTS

| 4,494,114 A | 1/1985 | Kaish |
| 5,406,261 A | 4/1995 | Glenn |
| 5,578,991 A | 11/1996 | Scholder |
| 5,729,596 A | 3/1998 | Reeder et al. |
| 5,748,084 A | 5/1998 | Isikoff |
| 5,760,690 A | 6/1998 | French |
| 5,767,771 A | 6/1998 | Lamont |
| 6,072,393 A | 6/2000 | Todd |

FOREIGN PATENT DOCUMENTS

EP 0 127 258 A2 12/1984

(Continued)

*Primary Examiner*—Daniel Wu
*Assistant Examiner*—Samuel J. Walk
(74) *Attorney, Agent, or Firm*—Rothwell, Figg, Ernst & Manbeck, P.C.

(57) ABSTRACT

A device for deterring theft of an electrical or like appliance having an operation controlling microprocessor, including signal receiving means (2) connected to the microprocessor and adapted for connection to a power supply, first programmed means enabling the appliance microprocessor to disable the appliance, second programmable means separate from the appliance and including a microprocessor controlled signal generating means (1) for generating setting and resetting signals for transmission to the receiving means and operating to enable the first programmed means to render the appliance inoperable when power to the appliance is disconnected, said second programmable means being programmed to include an automatic reset routine which is activated by the restoration of power to the appliance to send a resetting signal to the appliance microprocessor to reset the microprocessor to an operative state whereby automatic resetting occurs in the event of power failure event.

9 Claims, 16 Drawing Sheets

FOREIGN PATENT DOCUMENTS

| | | |
|---|---|---|
| EP | 0537525 A2 * | 4/1993 |
| GB | 2 265 238 A | 9/1993 |
| GB | 2 274 532 A | 7/1994 |
| GB | 2 303 726 A | 2/1997 |
| GB | 2 320 397 A | 6/1998 |
| GB | 2 322 216 A | 8/1998 |

* cited by examiner

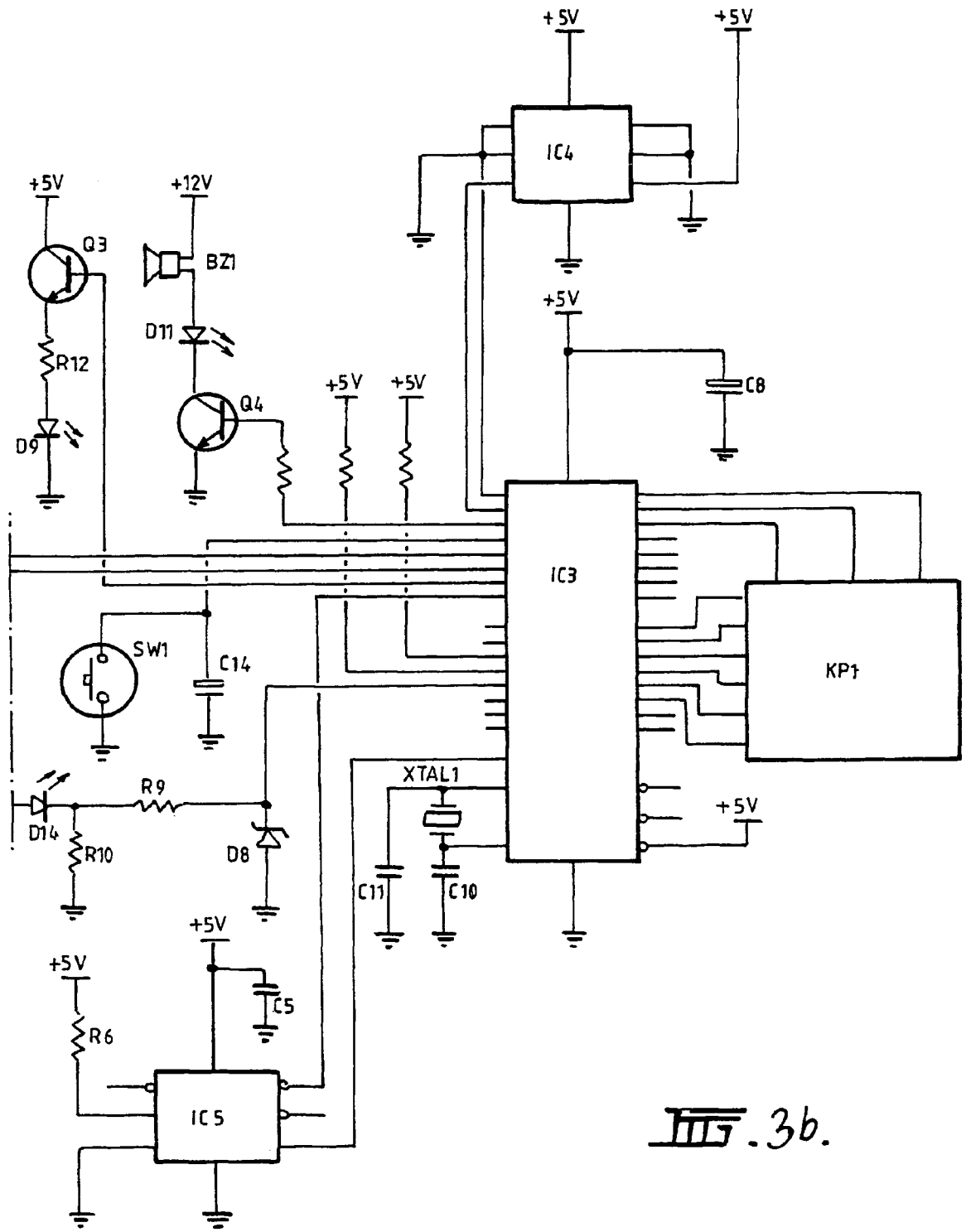

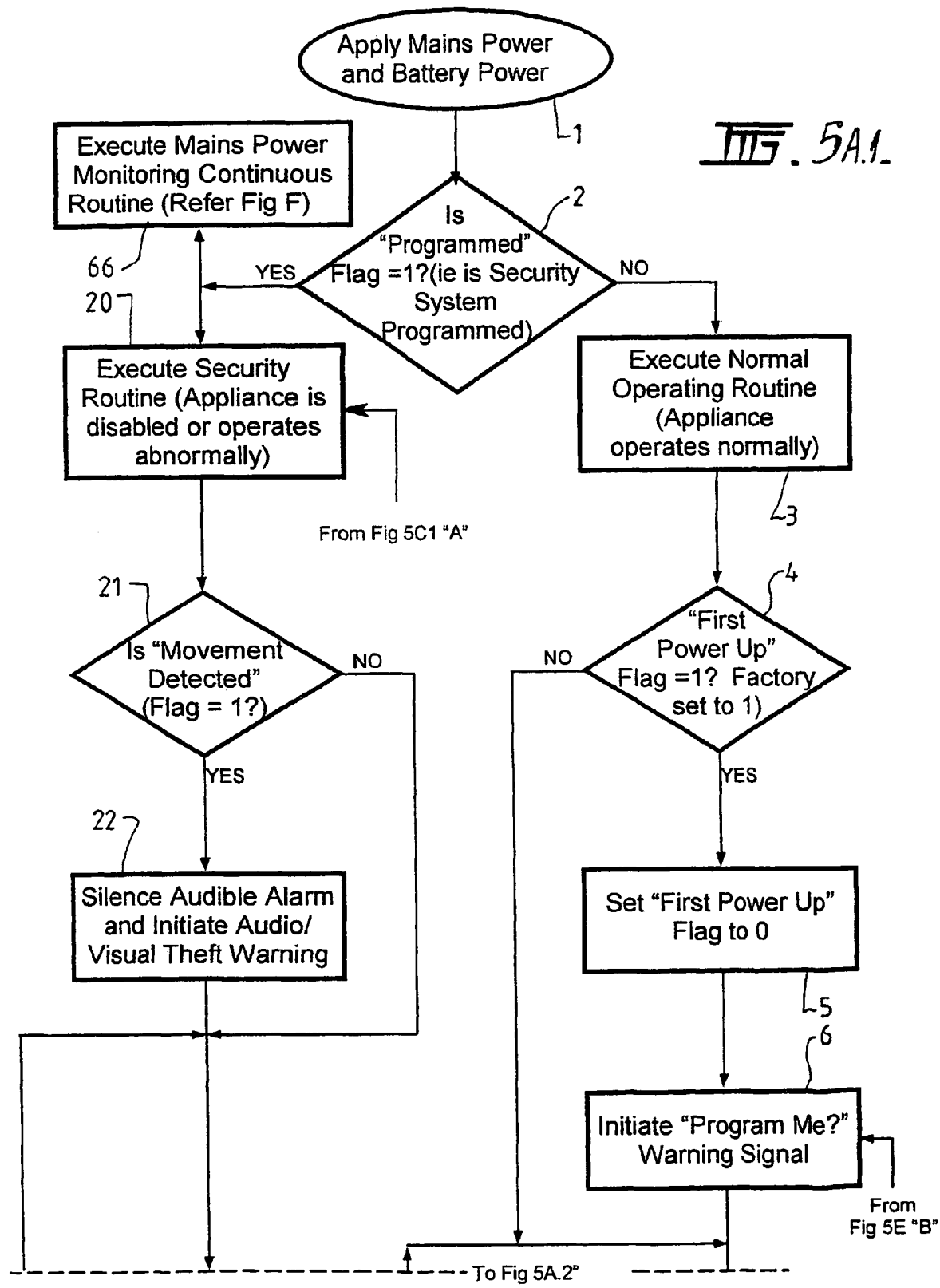

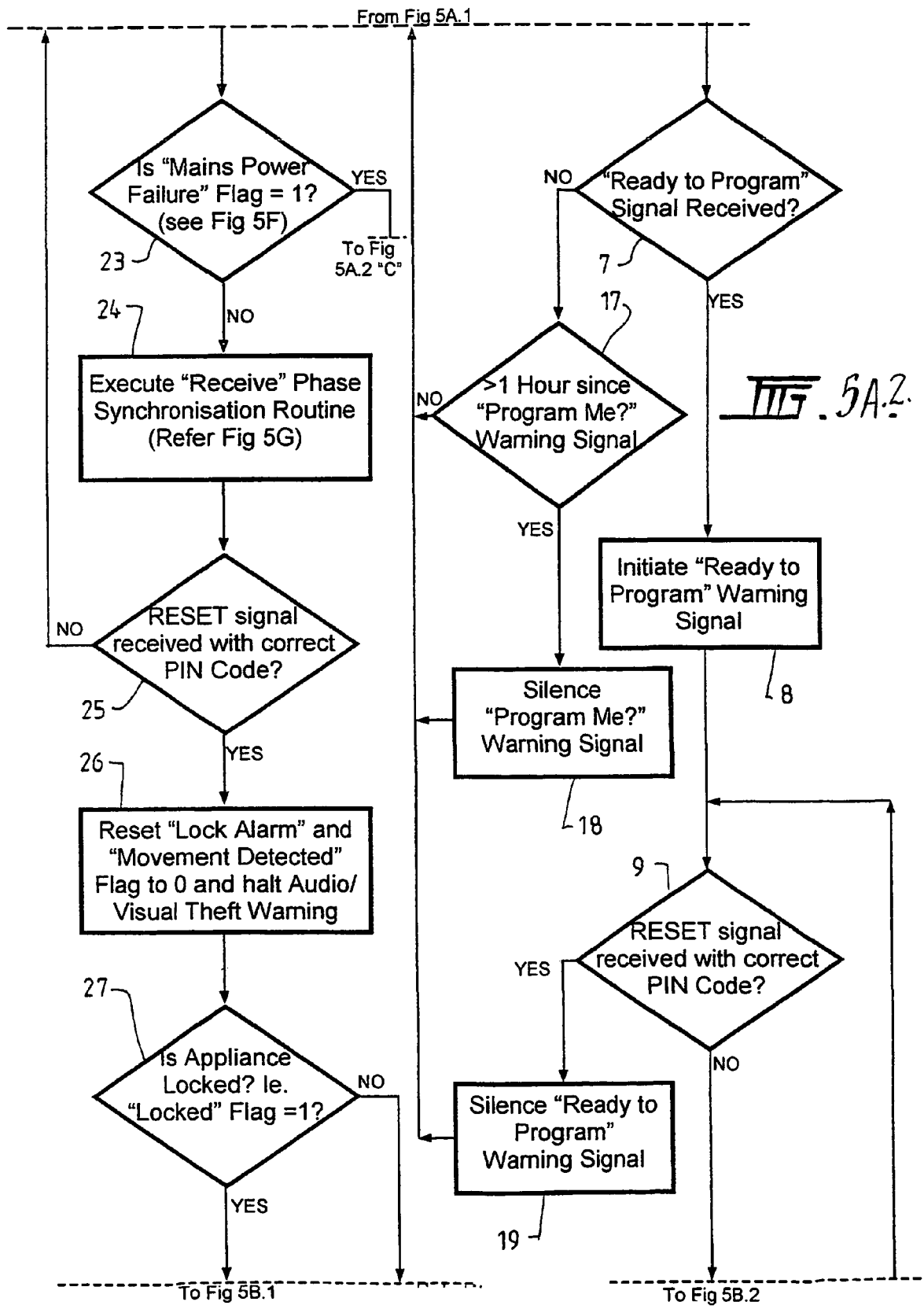

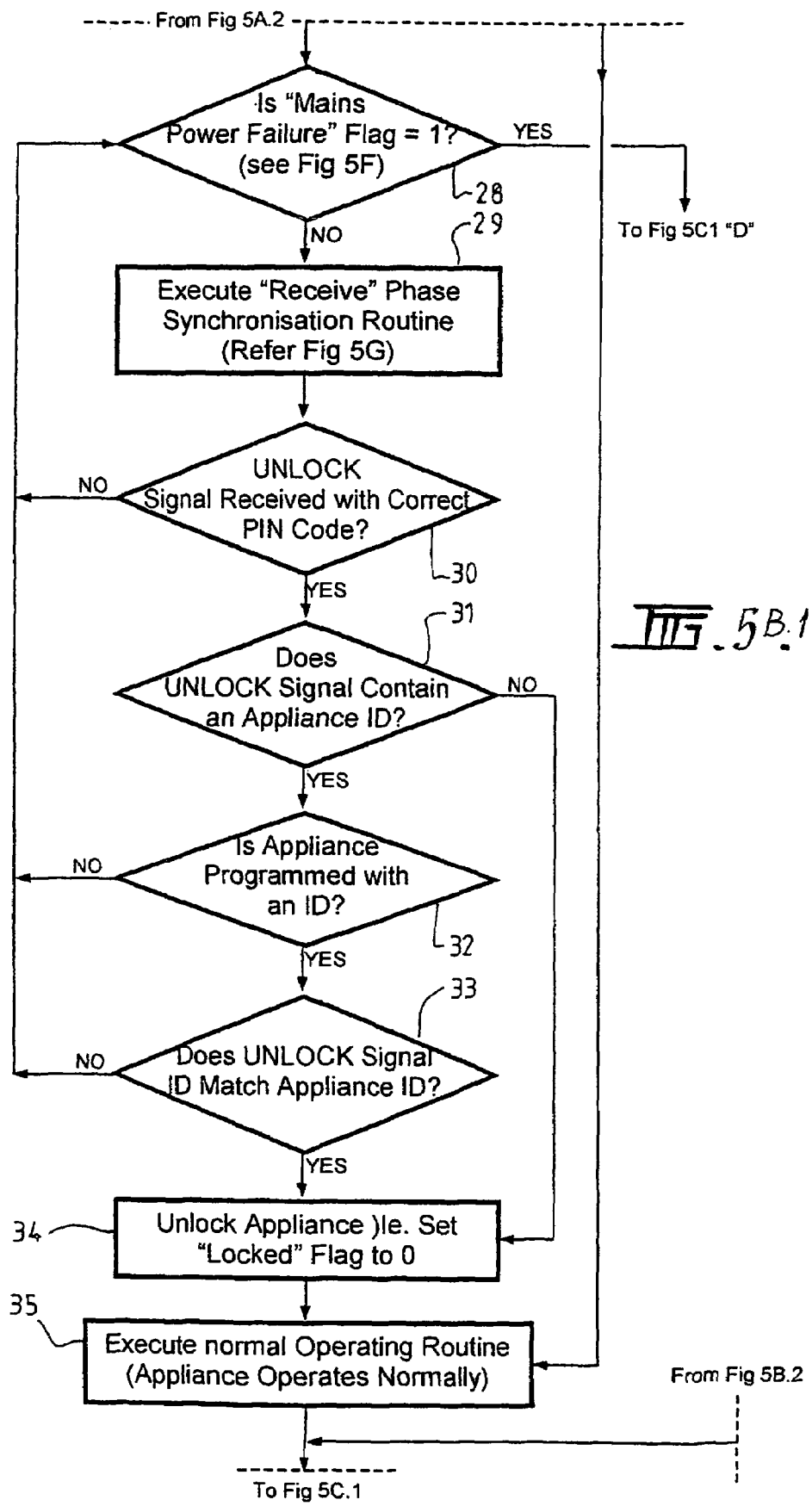
FIG. 5B.1

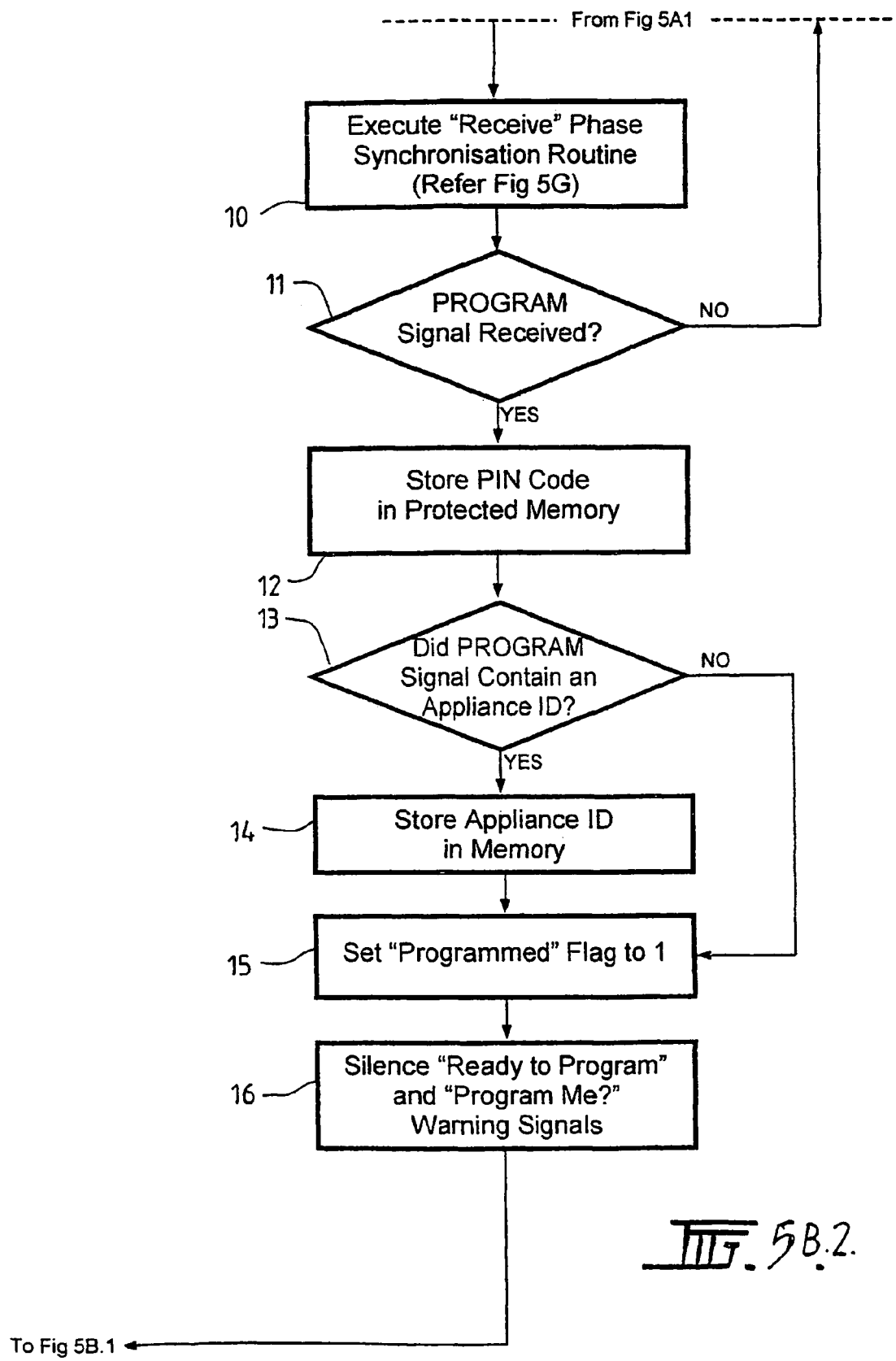
Fig. 5B.2.

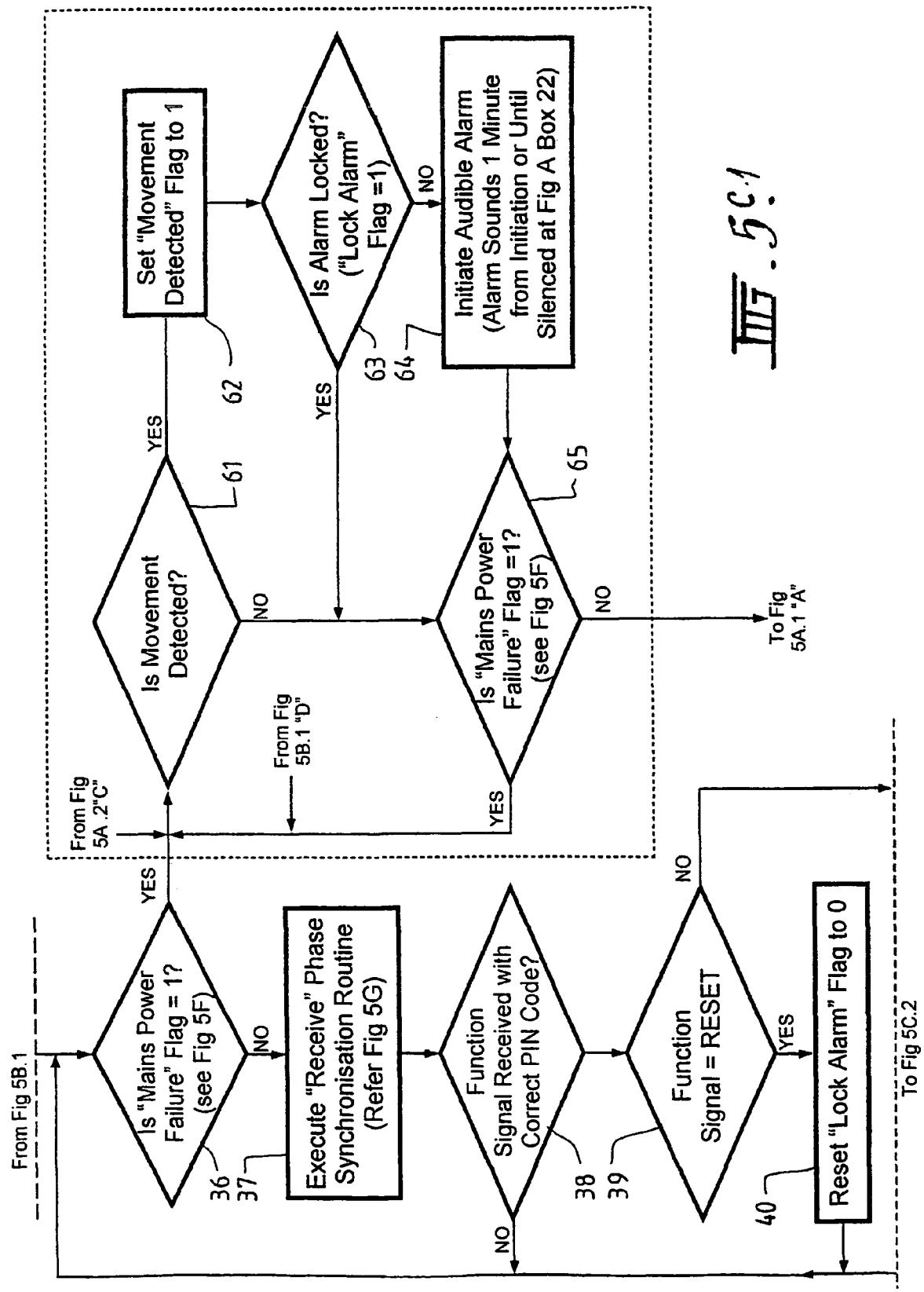

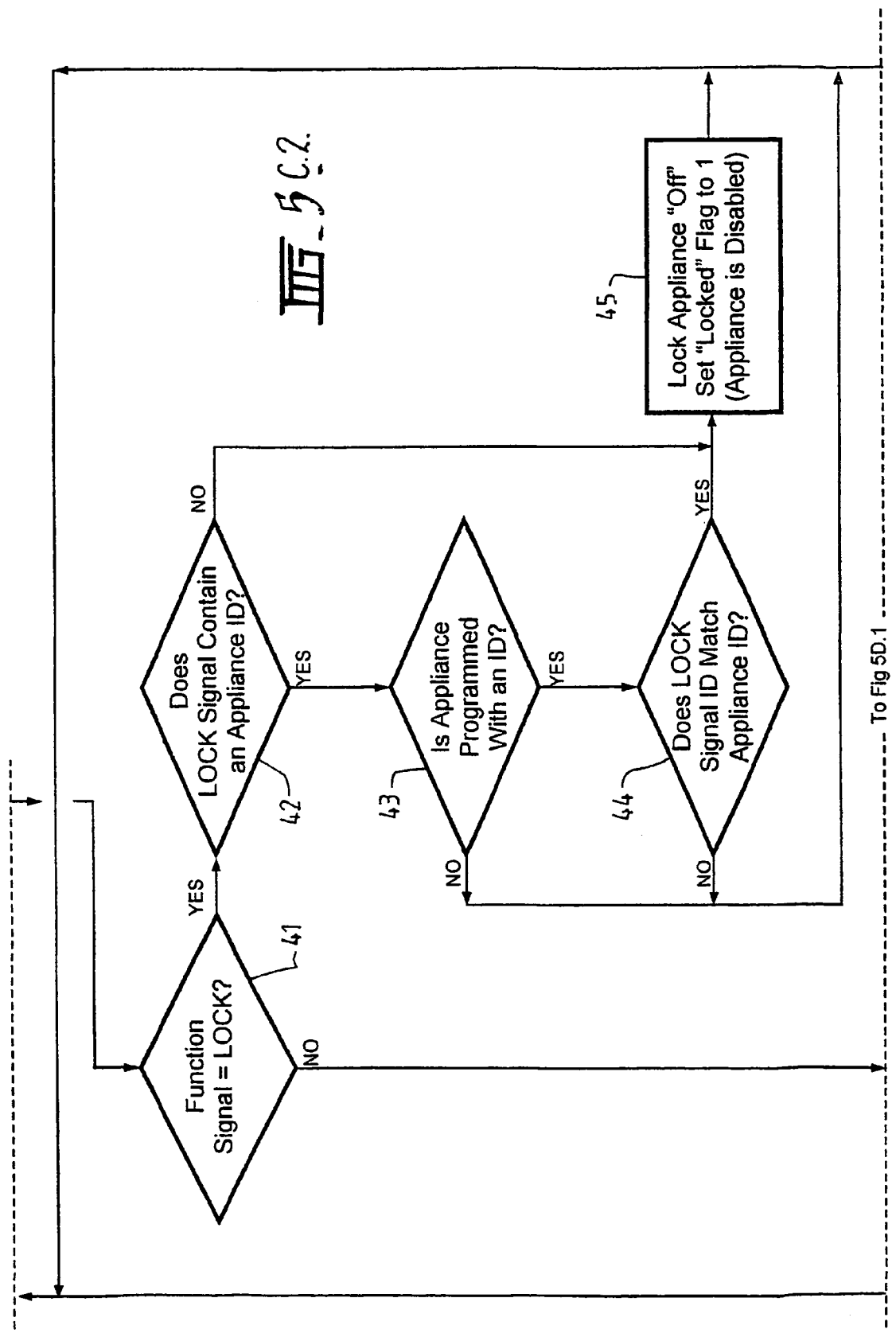

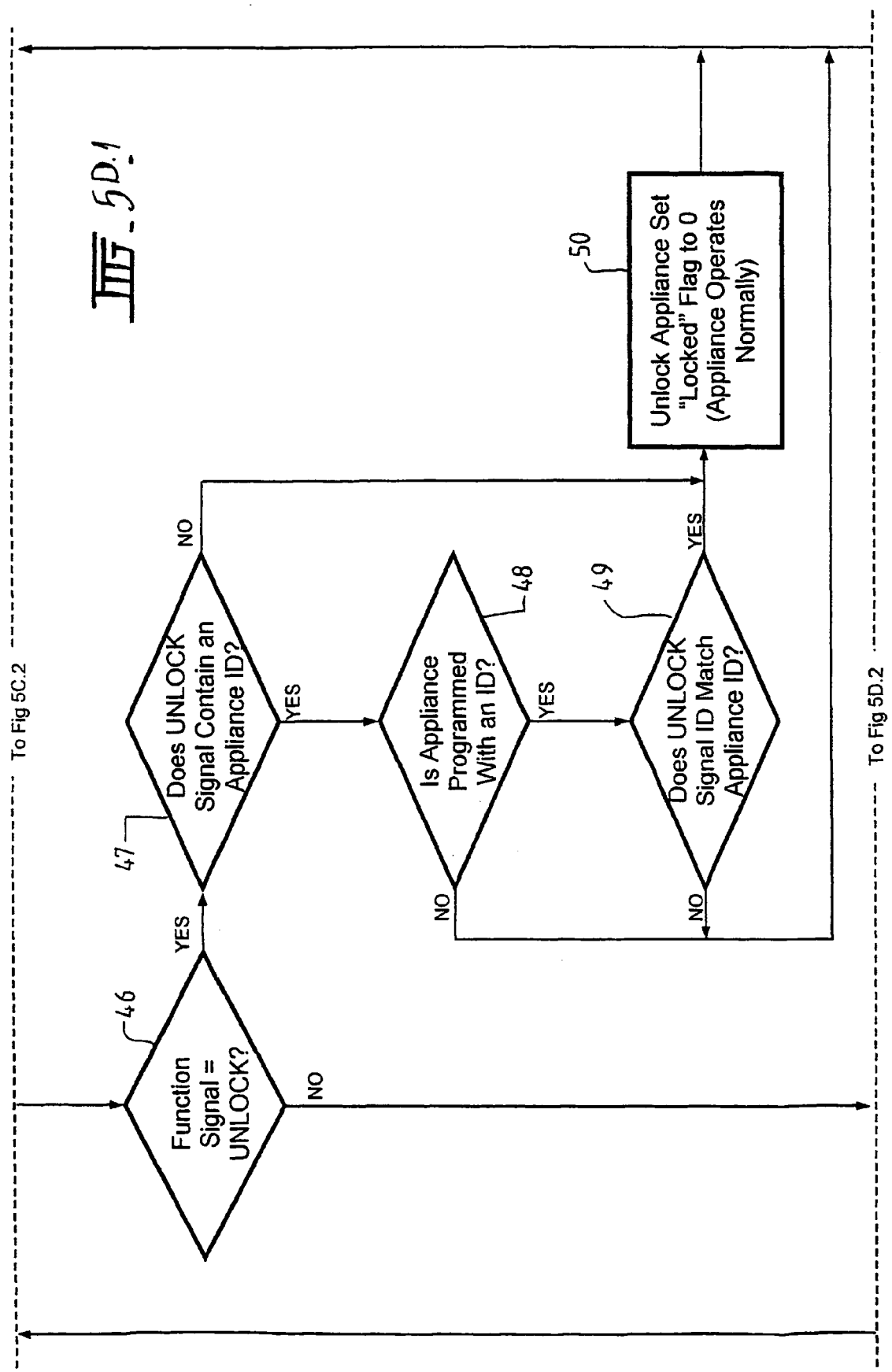

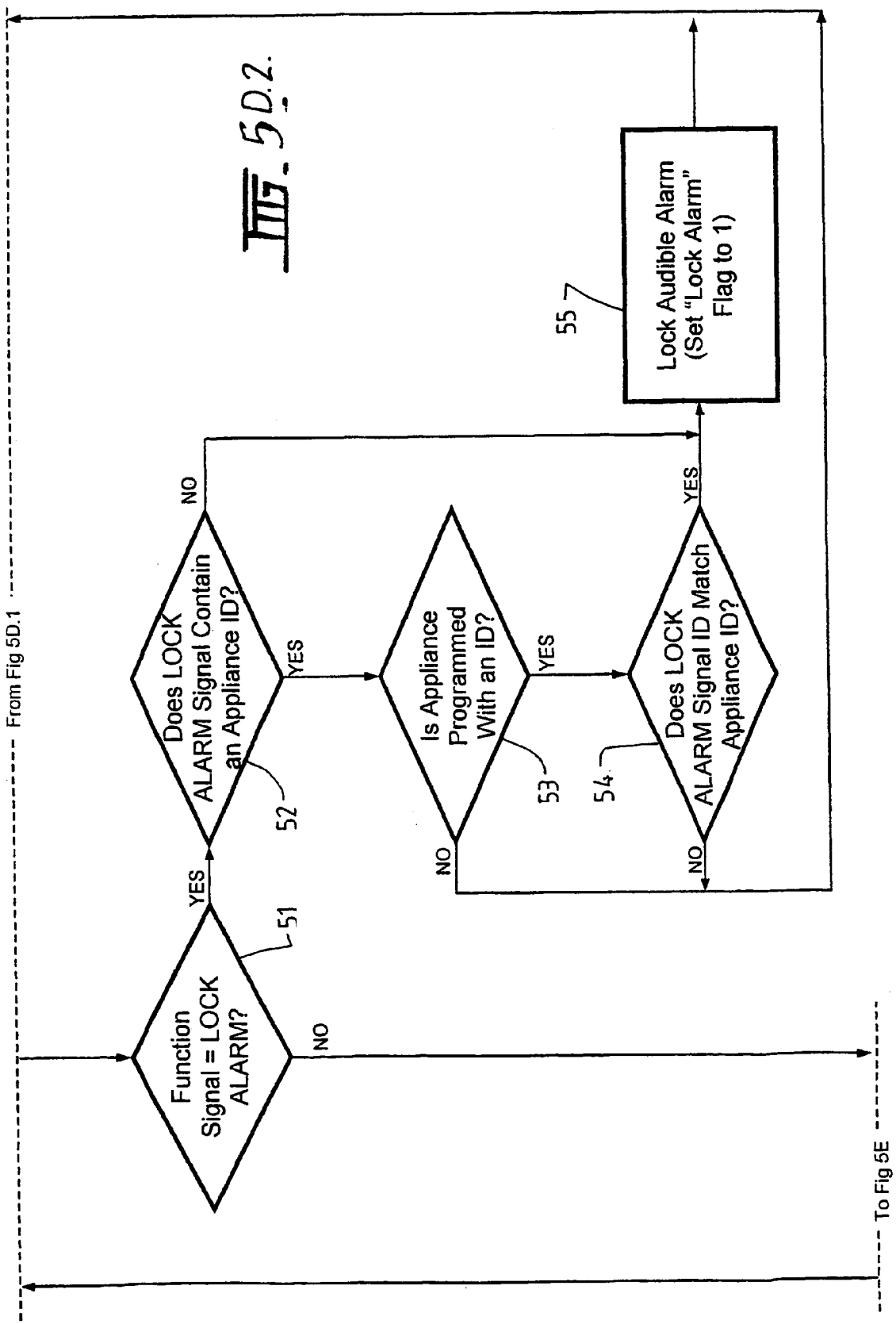
FIG. 5D.2.

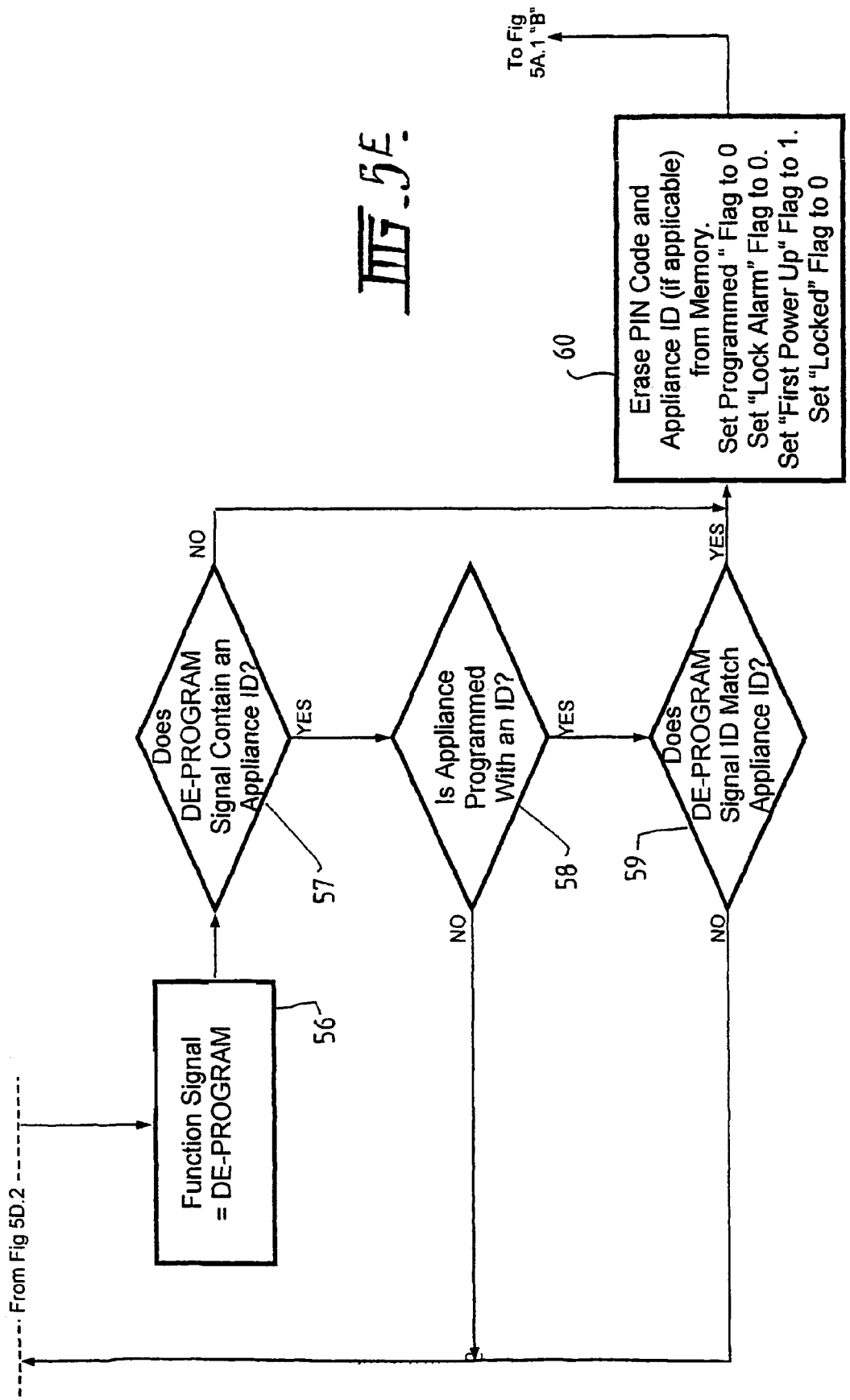

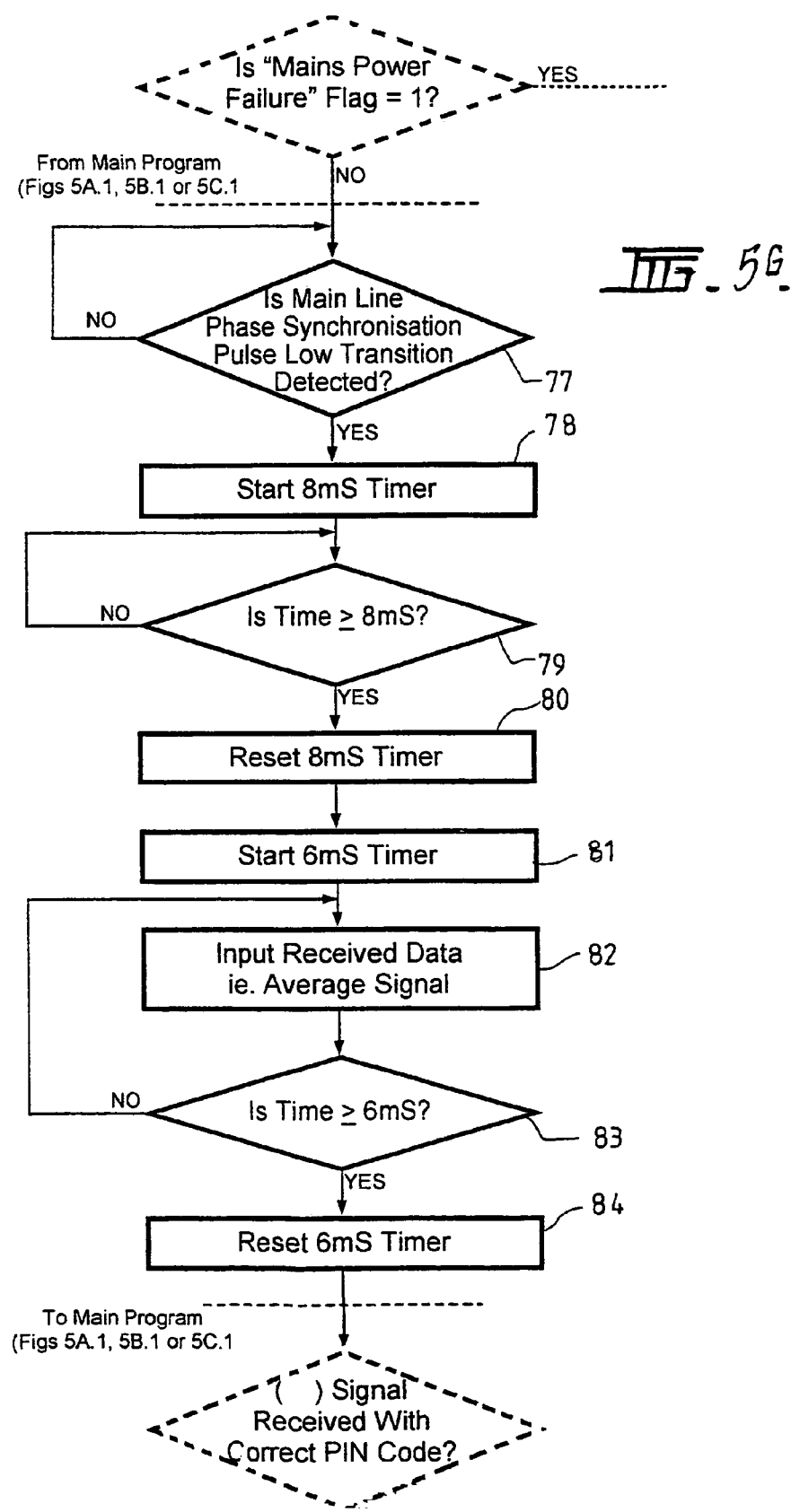

THEFT DETERRENT DEVICE FOR APPLIANCES

CROSS-REFERENCE TO RELATED APPLICATION

The present application is a national stage filing under 35 U.S.C. §371 of PCT/AU01/00914 filed on 26 Jul. 2001, and designating the U.S.

FIELD OF THE INVENTION

This invention relates to theft deterrent devices for electrical/electronic appliances.

BACKGROUND OF THE INVENTION

Theft deterrent-devices which are connected to an electrical appliance and which activate an alarm when the appliance is moved are known. Examples of such devices may be found in the patent literature, for example, WO 98/06072 and WO 99/08244, each of which suffer from the disadvantage that the security device is an add-on to the appliance and is therefore removable or disarmable by a skilled burglar. Other devices are complex to install or disarm in the event that movement of the appliance is authorised (WO 98/1809).

Deterrent devices which operate to render an appliance inoperable when the power supply is removed are to be found in U.S. Pat. Nos. 4,494,114 Kaish and 5,767,771 Lamont, and in European Publication 127258 Witehira. Kaish and Witehira do not allow the necessary setting and resetting operations to be performed simultaneously on a group of appliances connected to a common power source, thereby requiring such operations to be performed independently on each appliance. Lamont has the distinct disadvantage of rendering the appliance permanently disabled except by replacement of the disabled component, which involves serious cost consequences for the owner of the appliance, in the event that the appliance is removed or in the event that the defined events occur inadvertently. More particularly, none of the devices detailed above satisfactorily address the effects of mains power failure on their operation.

SUMMARY OF THE INVENTION AND OBJECT

It is an object of the present invention to provide a theft deterrent device for mains powered appliances which operates when power to the appliance is disconnected and which facilitates automatic resetting of the appliance to an operative state in the event that the disconnection of power is due to a power failure.

The invention provides a device for deterring theft of an electrical or like appliance having an operation controlling microprocessor, including signal receiving means connected to the microprocessor and adapted for connection to a power supply, first programmed means enabling the appliance microprocessor to disable the appliance, second programmable means including a microprocessor controlled signal generating means for generating setting and resetting signals for transmission to the receiving means, said setting signals operating to enable the first programmed means to render the appliance inoperable when power to the appliance is disconnected, said resetting signal operating to reset the microprocessor to an appliance operative state, said second programmable means being programmed to include an automatic reset routine which is activated by the restoration of power to the appliance following a power failure event to send a said resetting signal to the appliance microprocessor to reset the microprocessor to an appliance operative state whereby automatic resetting occurs in the event of a power failure event.

Preferably, the setting and resetting signals are transmitted via the power supply of the appliance. The programmable means preferably further includes security code inputting means to enable user setting and resetting of the appliance microprocessor when required.

Preferably, the second programmable means is separate from the appliance.

The device may include motion sensing means associated with the signal receiving means for detecting movement of the appliance and also preferably preventing resetting of the appliance microprocessor to an operative state other than by means of the security code inputting means. Preferably the motion sensing means is associated with an alarm circuit controlled by the appliance microprocessor to activate the alarm circuit in the event that power to the appliance is disconnected and the appliance is moved, as in the case of theft of the appliance.

In a preferred form of the invention, the second programmable means includes a motion sensing means operable to inhibit the automatic resetting routine programmed into the second programmable means in the event that the second programmable means is moved while power supply to the second programmable means is disconnected, or in the event that the second programmable means is moved for a predetermined time while power supply to the second programmable means is connected.

The second programmable means is preferably capable of being plugged into a power outlet of a mains power supply to which one or more appliances having said signal receiving means are connected whereby signals generated by said signal generating means can be transmitted via the power supply to set and reset the appliance microprocessors of said one or more appliances.

The programming of the first and second programmable means may be protected by appropriate security encryption known in the art or specifically developed for the present application.

More specifically, the deterrent device therefore comprises a two part electronic system for the protection of portable electrical and electronic appliances which contain an embedded microprocessor, such as computers, TV's, VCR's, hi fi's, facsimiles, microwave ovens, and the like. One part of the system, the receiver, consists of an electronically programmable control device integrated with microprocessor circuitry of the appliance which renders the appliance inoperable, and, if desired, arms an audible alarm, inside the appliance, should the mains power supply be disconnected, as is the case when the appliance is being stolen. If the appliance is then physically moved, and the alarm option is included, a motion sensor associated with the appliance causes an audible alarm to sound. The microprocessor in the appliance can be programmed to repeatedly display or emit a warning message such as "stolen appliance" when the mains power supply to the appliance is reconnected.

The second part of the system consists of a small portable programmable security protected programming/resetting device, the "transducer", which is plugged into the mains power supply and used by the owner or authorised user of the appliance, to send pre-programmed electronic identification instruction codes to one or more appliances via the mains wiring to achieve one or more of the following functions:

Program the receiver to the operable state, such that any subsequent disconnection of the mains power supply to the appliance will render the appliance inoperable and arm the audible alarm, if provided;

Reset the receiver following an authorised or accidental disconnection of the mains power supply, to render the appliance operable and disarm the audible alarm, if provided;

Disable the audible alarm if provided so that the appliance can be disconnected from the mains power supply by the owner and moved without initiating the alarm;

Render the appliance inoperable without it being disconnected from the mains power supply, to prevent unauthorised use and restore the appliance to the operable state after it has been rendered inoperable;

De-program the receiver to restore the appliance to its unprogrammed state.

As defined above the transducer has an automatic reset feature whereby, when left plugged in to the mains power supply, the transducer will automatically transmit a reset signal to one or more appliances immediately after the mains power supply is restored following a mains power supply interruption.

BRIEF DESCRIPTION OF THE DRAWINGS

FIGS. 5A to 5G are flow charts which describe one preferred programming and operating sequence of the first means of the deterrent system; and

DESCRIPTION OF PREFERRED EMBODIMENT

Figure 1:
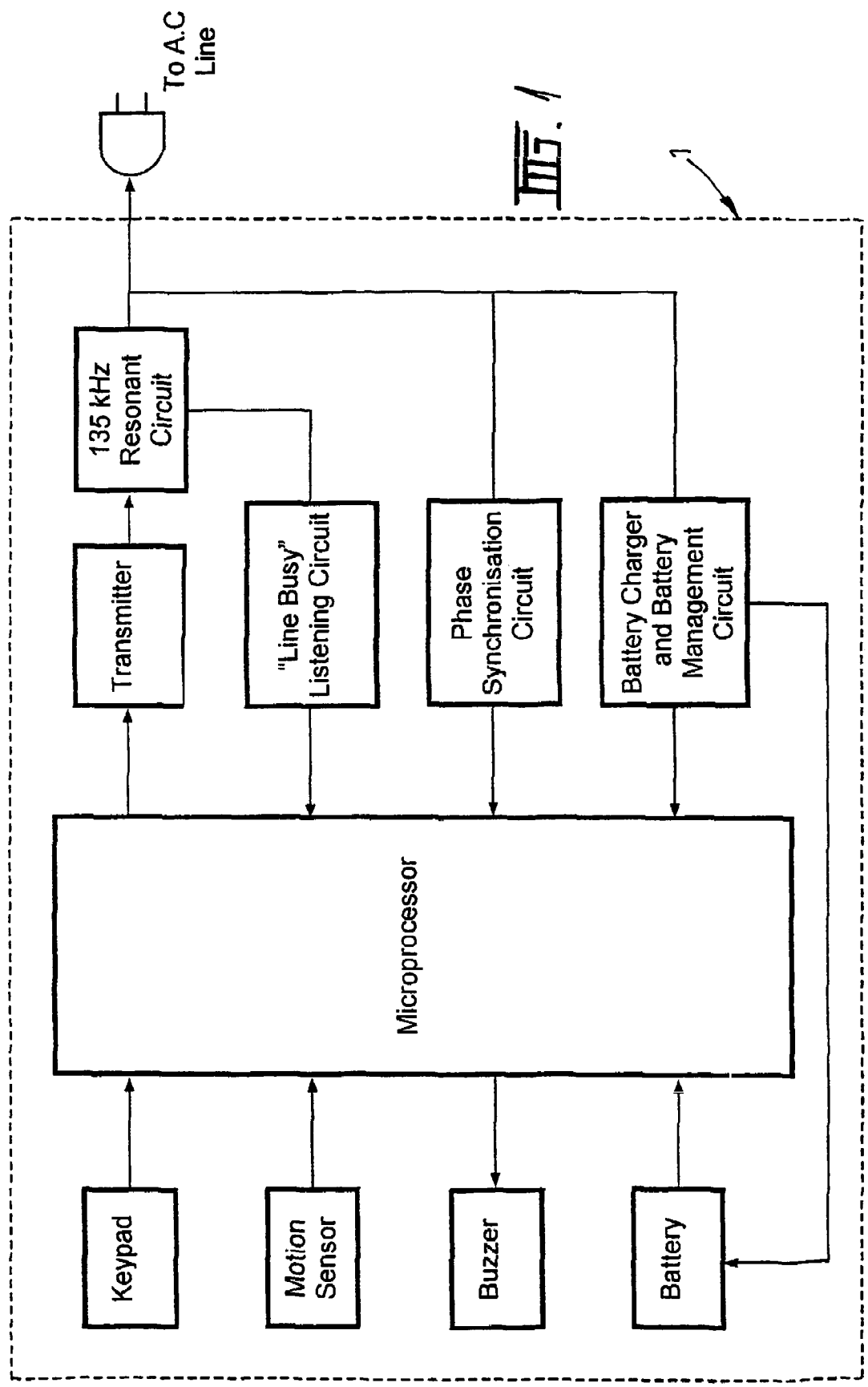
FIG. 1 is a functional block diagram of the second programmable means (transducer) of the deterrent system.
Figure 2:
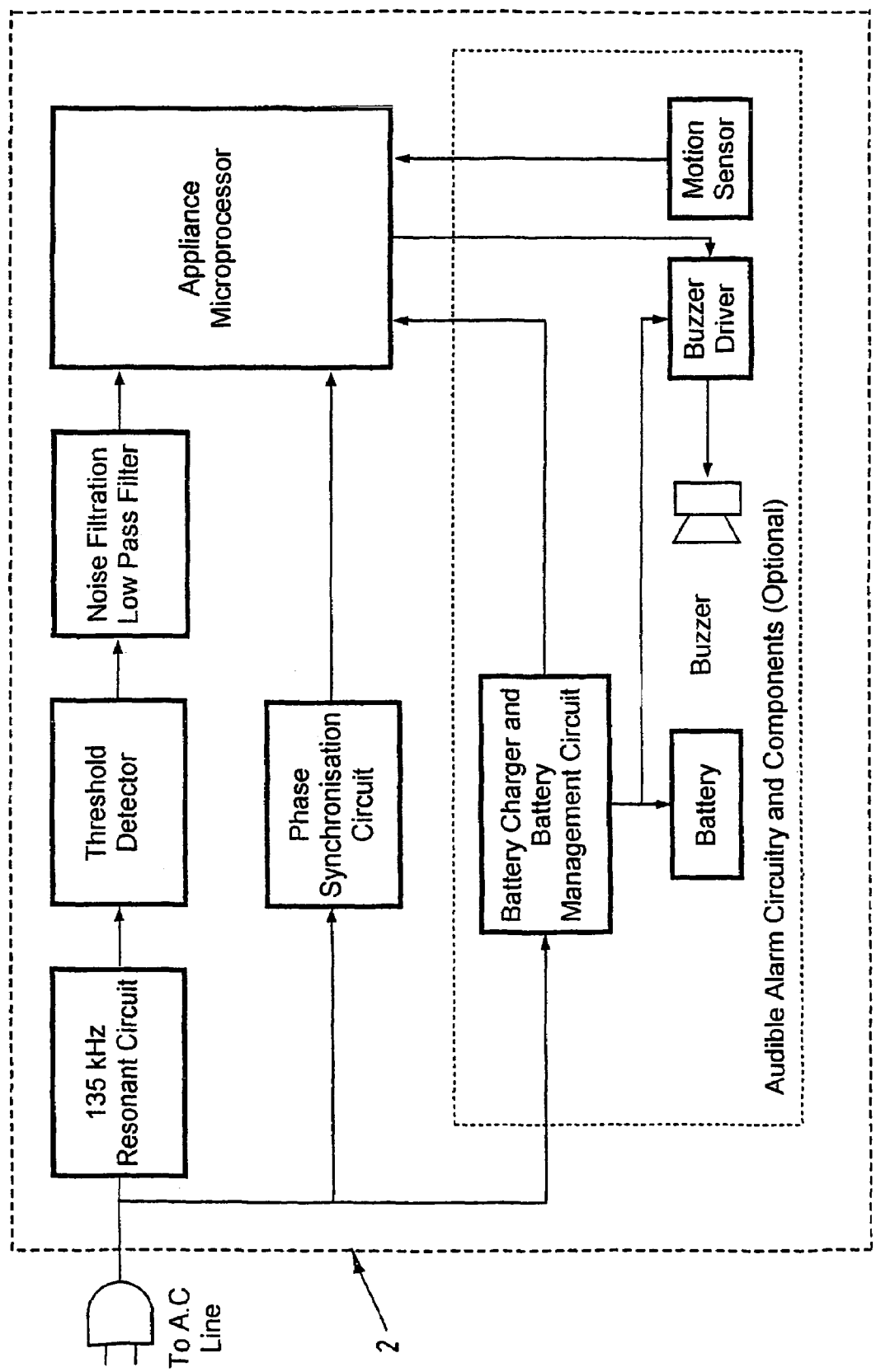
FIG. 2 is a functional block diagram of the first means (receiver) of the deterrent system.

Referring firstly to FIGS. 1 and 2, the deterrent system embodying the invention includes a separate transducer 1 adapted for connection to the mains power supply and a receiver 2 connected to the microprocessor of the appliance to be protected and also connected to mains power supply.

The transducer 1 includes:

(a) Microprocessor—the main functions of the microprocessor are:
  to encode inputs received from the keypad;
  to store the owner's access code (hereinafter referred to as the PIN code) in protected non-volatile memory
  to encrypt the PIN code using a software algorithm;
  to compare each entered PIN code with the PIN code stored in memory and accept if correct, reject if incorrect;
  to generate coded tone burst control signals including the encrypted PIN code for transmission to the appliance receivers;
  to synchronise the tone burst control signals with the AC mains waveform based on information received from the phase synchronisation circuit;
  to generate an automatic reset signal for transmission to the appliance receiver when AC power is restored following a power failure, provided that the transducer and/or the appliance has not been moved during the absence of AC power;
  to inhibit automatic reset transmission if the transducer has been moved during absence of AC power or if it has been moved for a predetermined time during presence of AC power;
  to ignore keypad inputs for a predetermined time after three successive incorrect PIN codes have been entered (to resist attempts to discover the owner's PIN code by trial and error.)
  to give an audible warning signal when an incorrect or invalid PIN code is entered;
  to give an audible indication when any key on the keypad is pressed.

(b) Keypad—is used by the owner/authorised user to enter the PIN code and specific function commands to control the system.

(c) Transmitter—amplifies the coded tone burst control signals generated by the microprocessor and transmits them over the AC power line to one or more appliance receivers.

(d) 135 kHz resonant circuit—couples the transmitter output to the AC line, and acts as an input filter for the Line Busy listening circuit, to attenuate signals and noise outside the 135 kHz frequency band.

(e) Phase synchronisation circuit—synchronises the coded tone burst control signals with the AC power frequency waveform to ensure that transmission occurs at the most advantageous points in the AC cycle.

(f) Line Busy listening circuit—monitors the AC line at the transmission frequency of 135 kHz and inhibits automatic transmission of reset signals if there is a transmission from another transducer in progress, or random noise on the line.

(g) Motion sensor—detects movement of the transducer. If movement occurs and AC power is absent, or if movement occurs for a predetermined time and AC power is present, this is interpreted as "tansducer being stolen", and the automatic reset transmission function is inhibited. This function remains inhibited until the owner re-enters the PIN code via the keypad.

(h) Buzzer—provides key press indication when any key on the keypad is pressed, and audible indication of incorrect PIN code, etc;

(i) Battery—provides power to the microprocessor when AC power is absent and enables the motion sensor to inhibit the automatic reset transmission function as described in (g) above.

(j) Battery charger and battery management circuit—the battery charger maintains the battery in a charged state when AC power is available. The battery management circuit disconnects the battery from the microprocessor when the battery voltage falls to a pre-set value (e.g. if the transducer is disconnected from mains power for an extended period.) to ensure correct shutdown of the microprocessor. Some types of microprocessor have an on-board battery management circuit, in which case the external circuit shown is not required.

The receiver 2, includes:

(a) 135 kHz resonant circuit—accepts 135 kHz tone burst signals from the transducer and attenuates signals and noise on either side of this frequency;

(b) Threshold detector—rejects signals with amplitude less than a pre-set level;

(c) Noise filtration low pass filter—rejects noise spikes;

(d) Phase synchronisation circuit—enables the microprocessor to "listen" only during those parts of the AC power frequency cycle where transmission actually occurs.

Optional components and circuitry for an audible alarm:

(e) Battery—provides power to the appliance microprocessor and the buzzer;
(f) Motion sensor—initiates the audible alarm if the appliance is moved while AC power is absent;
(g) Buzzer driver—provides battery power to the buzzer when the microprocessor initiates an alarm;
(h) Buzzer—provides an audible signal to indicate the alarm state;
(i) Battery charger and battery management circuit—the battery charger maintains the battery in a charged state when AC power is available. The battery management circuit disconnects the battery from the microprocessor if the battery voltage falls to a pre-set value, to ensure correct shutdown of the microprocessor. Some types of microprocessor have an on-board battery management circuit, in which case the external circuit shown is not required.

The primary reason for using a separate transducer is economic. The basic appliance receiver, excluding the optional audible alarm components and circuitry, can be added to an appliance for an incremental cost of less than about US$1, so there is negligible economic disadvantage to a manufacturer installing the receiver. The extra components are entirely internal and therefore no tooling is required for modifying external housings, as would be the case if a keypad was added to the appliance. An important feature of the two-part system is the ability to detect mains power failure and automatically reset all appliances when mains power is restored. Without this, manual resetting by the owner would be required. To achieve automatic resetting without compromising security requires the ability to distinguish between a power failure (a benign event) and a theft event. A theft event always involves movement of the appliance and disconnection of mains power, so a means of detecting movement during absence of mains power is required. This requires the use of a motion sensor and a battery, both of which are comparatively expensive. It is more cost effective to place the cost creating components, together with a keypad, and related components in a separate device which is also capable of signalling to multiple appliances: the transducer. This also has a sales advantage, as the transducer being a separate device, can be sold separately at a realistic mark up, unaffected by the price sensitivity of the related appliances.

Figure 3A:
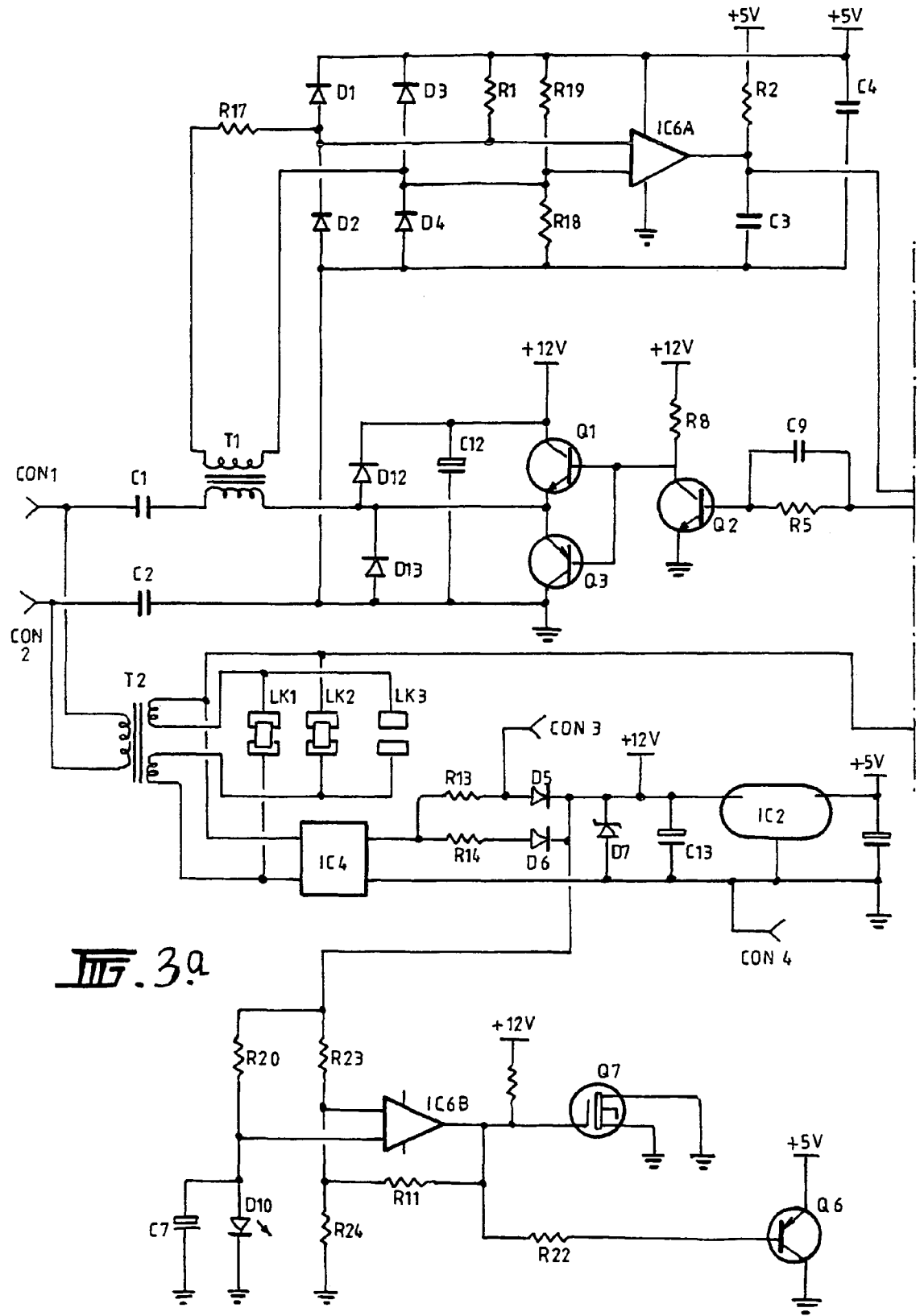
FIG. 3 is a circuit diagram of the second programmable means of the deterrent system.
Figure 4:
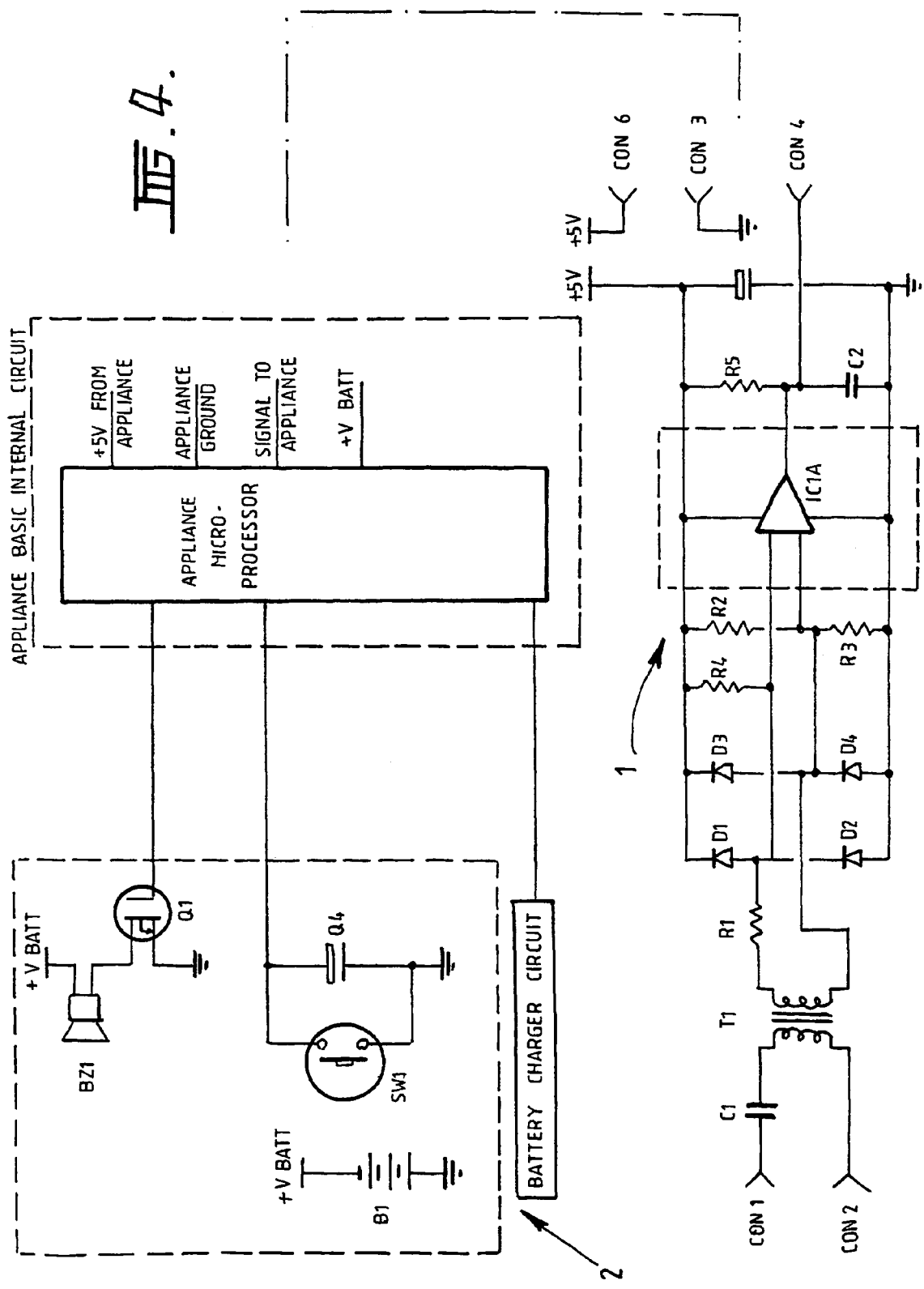
FIG. 4 is a circuit diagram of the first means of the deterrent system.

The preferred circuitry of the 'receiver' illustrated in FIG. 4, includes signal detecting circuitry 1 and the optional audible alarm circuitry 2 which are installed in the 'appliance'. Signals initiated by the 'owner' are transmitted from the 'transducer' (FIG. 3) via a pulse burst coded radio frequency sine wave carrier superimposed upon the AC power frequency voltage of the mains power supply to which both 'transducer' and 'appliance' are connected. The frequency and amplitude of the sine wave carrier comply with the permissible values for signalling over mains power supply wiring, as defined in International Electrotechnical Commission Standard 61000-3-8. The circuitry illustrated is designed to operate with a carrier frequency of 135 kHz and an amplitude of 0.6 V RMS. The carrier frequency tone bursts are detected by the resonant circuit formed by the capacitor C1 and inductor T1 which are tuned to the carrier frequency. In addition, the mains power supply frequency of 50 Hz or 60 Hz is heavily attenuated by the resonant circuit. The bridge rectifier formed by diodes D1, D2, D3, and D4 provides high frequency transient protection by ensuring that all voltage spikes transferred from the mains power supply wiring are absorbed by capacitor C3. The carrier frequency signal is extracted and magnified by the sensing auxiliary winding on inductor T1. When signal is present, the sine wave of the carrier is converted to a low active on the output of the comparator formed by IC1A and the delayed rise time RC combination of resistor R5 and capacitor C2. The time constant is chosen such that a high will be re-established after 5 to 20 135 kHz sine wave cycles. Dead band noise suppression is achieved by the 0.5 volt offset bias voltage established by the voltage divider formed by resistors R1 and R4. The effect of the overall 'receiver' circuit is to provide a low output upon detection of a 135 kHz sine wave tone burst on the mains power supply wiring, and a high output upon absence of 135 kHz sine wave tone burst.

The optional audible alarm circuitry 2 initiates an audible alarm when the 'appliance' is moved following detection of loss of mains power supply at the 'appliance'. These functions are all monitored and controlled by the 'appliance' microprocessor. An audible alarm will be produced by BZ1 via Q1 if loss of mains power supply occurs and the motion detector SW1 is activated. The motion detector SW1 is a movement-activated switch, such as a Farnell 732–795 device, whose contacts change state when movement occurs. Battery B1 is charged either by an internal battery charger circuit in the 'appliance' microprocessor (if available), or by external circuitry in the box labelled "Battery Charger Circuit".

The preferred circuitry of the 'transducer' is illustrated in FIG. 3, and includes some identical circuitry to the 'receiver', which is capable of "listening" to the mains power line and only allowing signal transmission when the line is quiet, i.e., when no other signals are present. This is achieved by sensing the mains line at the transmit frequency of 135 kHz via C1, C2 and T1. The sensing winding of T1 inputs to the circuitry associated with IC6A and works as previously discussed to produce a low output if 135 kHz tone burst from another source is present. This output from the receiver circuitry is connected to the microprocessor, which prevents transmission unless the line is quiet. The 135 kHz transmit signal is obtained directly from the microprocessor IC3 and is buffered by Q2, C9, and R5. The output square wave of the oscillator is buffered by Q1 and Q5 which drive the resonant circuit of C1, C2 and T1 to output 0.6V sine waves to the mains power line. The microprocessor IC3 has a clock frequency of 20 MHz defined by XTAL1, C11 and C10. Movement of the 'transducer' is detected and input to the microprocessor via motion detector switch SW1. The presence of mains power supply and phase is detected via R9, R10, D8 and D14 via the power transformer T2. The battery voltage is down regulated to 5V via IC2. The buzzer BZ1 and the light emitting diode D11 are driven by Q4 from the microprocessor and provide key press indication for the bank of press button switches on the keypad KP1. Battery/mains supply availability for the creation of the 5V supply rail is monitored and actively switched by the low voltage detector formed by the comparator IC6B, R20, R23, C7, D10, R24, and R11. The active switching of the 5V rail is via Q6, Q7, R21, and R22. The circuitry defined by R13, R14, D5, and D6 is to ensure that 5V to the microprocessor circuitry is still present even if the battery is totally discharged, ie. 0V. In addition, this circuitry supports charging of the internal battery. Microprocessor power reset monitoring is via IC5, C5 and R6. Non-volatile memory is provided by IC4.

Referring now to FIGS. 5A to 5G, the manner in which the appliance software functions will now be described:

When mains power and battery power are applied (Box 1), a check is carried out to determine whether the Security System is programmed (Box 2). If the system is not programmed, the microprocessor executes the appliance Normal Operating Routine (Box 3). In this state, the appliance operates normally in all respects, but the Security System is inactive, and therefore the appliance is not protected against theft or unauthorised use. The appliance is in this state when purchased new, or following a DE-PROGRAM operation.

The status of the "First Power Up" flag is then checked (Box 4). If the flag status equals 1, the flag is then reset to 0 (Box 5) and the "Program Me?" warning signal is initiated (Box 6). Hence the "Program Me?" warning signal is initiated on the first application of mains power and battery power to a new appliance, or the first application of mains power and battery power following a DE-PROGRAM operation, but not on subsequent applications of power. The "Program Me?" warning signal is provided to alert the owner that the Security System is inactive, and needs to be programmed if the owner wishes the appliance to be protected against theft or unauthorised use. The "Program Me?" warning signal will time out after 1 hour if the Security System has not been programmed by then. (Boxes 17 and 18).

When in the unprogrammed state, the appliance will respond to a "Ready to Program" signal at any time (Box 7). The "Ready to Program" signal is the means by which the owner/authorised user places the unprogrammed appliance in the state where it will accept a "Program" signal from the transducer to activate the Security System. An appropriate means of generating this signal must be provided by the appliance manufacturer. This may be either a software solution (eg. by switching the appliance off and on in a defined sequence), or a hardware solution (eg. a push button switch on the appliance). Note that the "Ready to Program" signal is not transmitted by the Transducer. When a "Ready to Program" signal is initiated (Box 7), the "Ready to Program" warning signal is generated (Box 8). The microprocessor then commences monitoring the time that has elapsed since initiation of the "Ready to Program" signal and, if less than 20 seconds have elapsed (Box 9), the "Receive" Phase Synchronisation Routine is executed (Box 10). This routine is depicted in FIG. 5G and described in detail on page 16. The purpose of this routine is to ensure that the microprocessor "listens" for signals only in the appropriate part of each cycle of the AC mains voltage waveform. If a PROGRAM signal is received, the PIN Code contained in the signal is stored in protected memory in the microprocessor (Box 12). If the PROGRAM signal contained an optional Appliance ID (Box 13), it is also stored in protected memory in the microprocessor (Box 14). The Appliance ID, if used, allows appliances to be addressed individually so that functions such as LOCK, UNLOCK, LOCK ALARM, and DE-PROGRAM can be directed to a specific appliance if multiple appliances are controlled from a single transducer. The "Programmed" Flag is then set to 1 (Box 15), indicating that the Security System is programmed, and the "Program Me" and "Ready to Program" warning signals are silenced (Box 16). The appliance Normal Operating Routine continues running as before, but the Security System program is now operative and the microprocessor enters the state of monitoring the status of mains power and waiting for a Function signal from the Transducer (Boxes 36, 37, and 38).

Figure 5F:
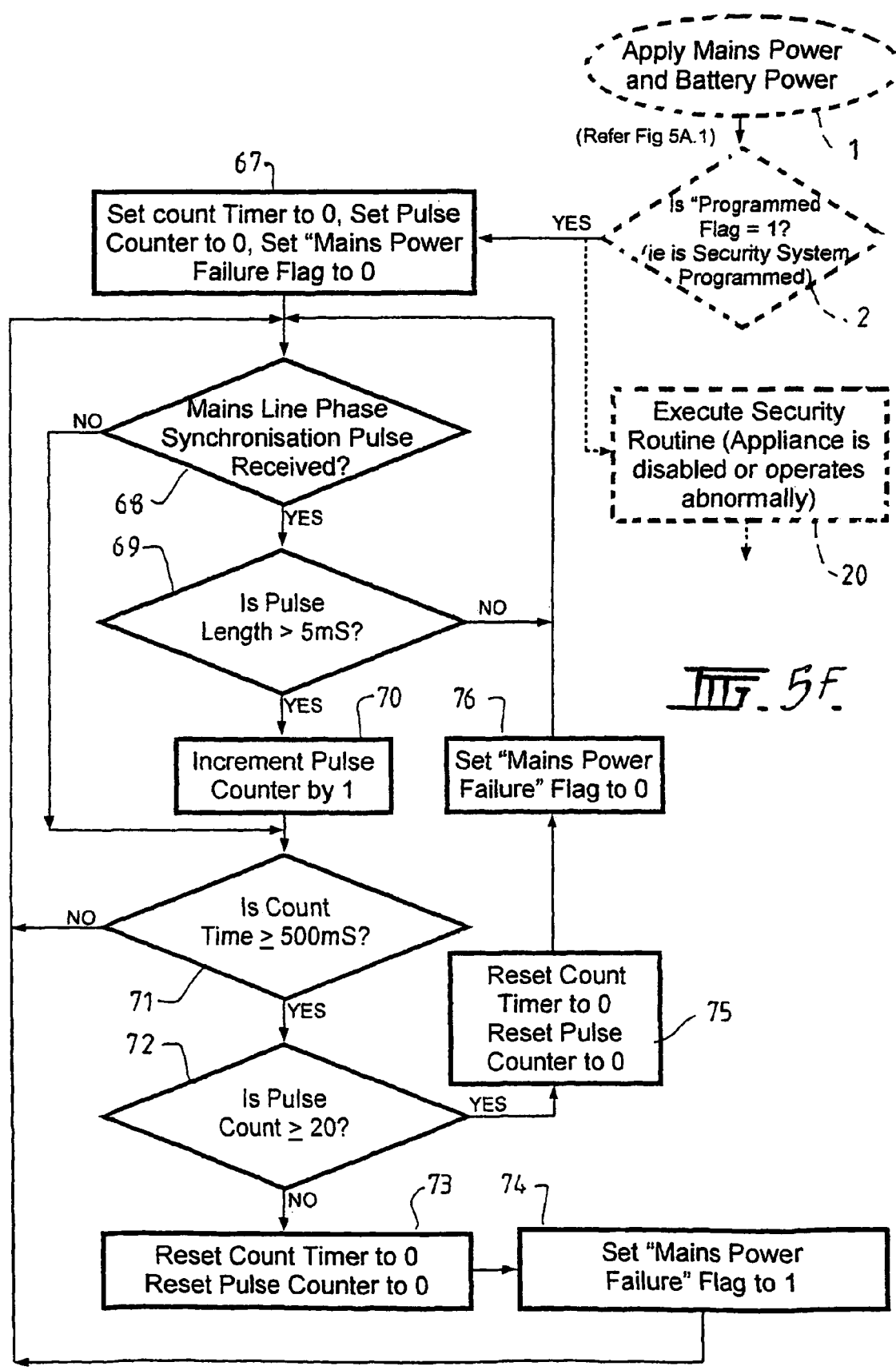

If more than 20 seconds have elapsed since receipt of the "Ready to Program" signal (Box 9), and a PROGRAM signal has not been received, the "Ready to Program" warning signal is silenced (Box 19). The microprocessor reverts to the state of checking whether another "Ready to Program" signal has been received (Box 7), and monitoring the elapsed time since the "Program Me" warning signal was initiated (Box 17). The reason for limiting to 20 seconds the time for which the Security System is in "Ready to Program" mode following receipt of a "Ready to Program" signal, is to minimise the possibility of the system being inadvertently programmed by another Transducer in the immediate vicinity. If more than 1 hour has elapsed since the "Program Me" warning signal was initiated, the signal is silenced (Boxes 17 and 18). If the Security System is programmed at the time of applying mains power (Box 2 "Yes" response), the microprocessor executes the Security Routine (Box 20). In this state, the appliance is either disabled (ie. does not operate) or operates abnormally, depending on how the Security Routine has been designed. The Mains Power Monitoring Continuous Routine (Box 66) is also executed continuously when power is applied and the Security System is programmed. This routine is depicted in FIG. 5F and described on page 15.

If the "Movement Detected" flag is set to 1 (Box 21), indicating that the appliance was moved during the absence of mains power, an audio/visual theft warning is initiated, and the audible alarm is silenced (Box 22). The audio/visual theft warning is applicable to appliances that are suitably equipped to generate such a warning and may, for example, consist of a pre-recorded verbal message played through the appliance audio system, and/or a written message displayed on a screen.

The microprocessor then enters the state of monitoring the status of mains power at the appliance (Box 23) and waiting for a RESET signal from the transducer (Box 25). The microprocessor "listens" for signals on the AC line for a specific time during each cycle of the AC voltage waveform, as determined by the "Receive" Phase Synchronisation Routine (Box 24). When a RESET signal containing the correct PIN Code is received (Box 25), the "Lock Alarm" and "Movement Detected" flags are both reset to 0, and the audio/visual theft warning is halted (Box 26).

Before the appliance is restored to normal operation (ie. "reset"), a check is performed to determine whether the appliance is locked, ie. "Locked" Flag=1 (Box 27). This check is required because the appliance must remain in the locked state if it was locked prior to the loss of mains power. If the appliance is not locked, the appliance Normal Operating Routine is executed (Box 35), and the appliance then operates normally. If the appliance is locked, the microprocessor enters the state of monitoring the status of mains power at the appliance, and waiting for an UNLOCK signal from the transducer (Boxes 28, 29, and 30).

If an UNLOCK signal containing the correct PIN Code is received (Box 30), a check is then carried out to determine whether the UNLOCK signal contained an Appliance ID (Box 31). If the signal does not contain an Appliance ID, the appliance is then unlocked ie. "Locked" Flag is reset to 0 (Box 34), and the appliance Normal Operating Routine is executed (Box 35). If the signal does contain an Appliance ID, checks are carried out to determine whether the appliance is programmed with an ID (Box 32) and if so, whether the ID contained in the UNLOCK signal matches the appliance ID (Box 33). If a match exists, the appliance is unlocked (Box 34) and the appliance Normal Operating Routine is executed (Box 35). If the appliance is not programmed with an ID (Box 32), or if the received ID does not match the appliance ID (Box 33), the microprocessor resumes the state of monitoring the status of mains power at the appliance and waiting for an UNLOCK signal from the transducer (Boxes 28, 29, and 30).

When the microprocessor is waiting for a RESET signal (Box 25 "No" response) or waiting for an UNLOCK signal (Box 30 "No" response), or is waiting for a Function signal, and mains power fails or is disconnected from the appliance (Box 23, Box 28 or Box 36 "Yes" responses), the microprocessor enters the movement monitoring and audible alarm initiating sequence (Boxes 61, 62, 63, 64, and 65). This sequence is described on Page 14.

When the Normal Operating Routine is being executed (Box 35), the microprocessor continuously monitors the presence of mains power at the appliance (Box 36), and is capable of responding to any of the available function signals from the transducer (Boxes 37 and 38), provided that such signals contain the correct PIN Code.

When the Function signal is RESET (Box 39) the "Lock Alarm" flag is set to 0 (Box 40), restoring the battery powered audible alarm to its normal state if it was previously locked (ie. disabled) by the operation of the LOCK ALARM function (see Box 55).

When the Function signal is LOCK (Box 41), a check is carried out to determine whether the LOCK signal contained an Appliance ID (Box 42). When the LOCK signal does not contain an Appliance ID (Box 42), the appliance is locked in the disabled state, and the "Locked" flag is set to 1 (Box 45). When the LOCK signal does contain an Appliance ID (Box 42), checks are carried out to determine whether the appliance is programmed with an ID (Box 43) and, if so, whether the Appliance ID contained in the LOCK signal matches the programmed Appliance ID (Box 44). If the appliance is programmed with an ID (Box 43), and the Appliance ID contained in the LOCK signal matches the programmed Appliance ID (Box 44), the appliance is locked in the disabled state, and the "Locked" flag is set to 1 (Box 45). If the appliance is not programmed with an ID (Box 43), or the Appliance ID contained in the LOCK signal does not match the programmed Appliance ID (Box 44), the appliance microprocessor ignores the LOCK signal and reverts to the state of checking mains power and waiting for a Function signal from the transducer (Boxes 36, 37, and 38).

When the Function signal is UNLOCK (Box 46), a check is carried out to determine whether the UNLOCK signal contained an Appliance ID (Box 47). When the UNLOCK signal does not contain an Appliance ID (Box 47), the appliance is unlocked, and the "Locked" flag is set to 0 (Box 50). When the UNLOCK signal does contain an Appliance ID (Box 47), checks are carried out to determine whether the appliance is programmed with an ID (Box 48) and, if so, whether the Appliance ID contained in the UNLOCK signal matches the programmed Appliance ID (Box 49). If the appliance is programmed with an ID (Box 48), and the Appliance ID contained in the UNLOCK signal matches the programmed Appliance ID (Box 49), the appliance is unlocked, and the "Locked" flag is set to 0 (Box 50). If the appliance is not programmed with an ID (Box 48), or the Appliance ID contained in the UNLOCK signal does not match the programmed Appliance ID (Box 49), the appliance microprocessor ignores the UNLOCK signal and reverts to the state of checking mains power and waiting for a Function signal from the transducer (Boxes 36, 37, and 38).

When the Function signal is LOCK ALARM (Box 51), a check is carried out to determine whether the LOCK ALARM signal contained an Appliance ID (Box 52). When the LOCK ALARM signal does not contain an Appliance ID (Box 52), the audible alarm is locked (ie. the alarm will not operate if the appliance is moved after mains power is disconnected), and the "Lock Alarm" flag is set to 1 (Box 55). When the LOCK ALARM signal does contain an Appliance ID (Box 52), checks are carried out to determine whether the appliance is programmed with an ID (Box 53), and, if so, whether the Appliance ID contained in the LOCK ALARM signal matches the programmed Appliance ID (Box 54). If the appliance is programmed with an ID (Box 53), and the Appliance ID contained in the LOCK ALARM signal matches the programmed Appliance ID (Box 54), the audible alarm is locked, and the "Lock Alarm" flag is set to 1 (Box 55). If the appliance is not programmed with an ID (Box 53), or the Appliance ID contained in the LOCK ALARM signal does not match the programmed Appliance ID (Box 54), the appliance microprocessor ignores the LOCK ALARM signal and reverts to the state of checking mains power and waiting for a Function signal from the transducer (Boxes 36, 37, and 38).

When the Function signal is DE-PROGRAM (Box 56), a check is carried out to determine whether the DE-PROGRAM signal contained an Appliance ID (Box 57). When the DE-PROGRAM signal does not contain an Appliance ID (Box 57), the PIN Code is erased from memory, the "Programmed" flag is set to 0, the "Lock Alarm" flag is set to 0, the "Locked" flag is set to 0, and the "First Power Up" flag is set to 1 (Box 60). The "Program Me?" warning signal is initiated (Box 6) and the microprocessor checks for receipt of the "Ready to Program" signal (Box 7). Hence the Security System is in the de-programmed state, and the appliance operates normally.

When the DE-PROGRAM signal does contain an Appliance ID (Box 57), checks are carried out to determine whether the appliance is programmed with an ID (Box 58) and, if so, whether the Appliance ID contained in the DE-PROGRAM signal matches the programmed Appliance ID (Box 59). If the appliance is programmed with an ID (Box 58), and the Appliance ID contained in the DE-PROGRAM signal matches the programmed Appliance ID (Box 59), the PIN Code and Appliance ID are erased from memory, the "Programmed" flag is set to 0, the "Lock Alarm" flag is set to 0, the "Locked" flag is set to 0, and the "First Power Up" flag is set to 1 (Box 60). The "Program Me?" warning signal is initiated (Box 6) and the microprocessor checks for receipt of the "Ready to Program" signal (Box 7). Hence the Security System is in the de-programmed state, and the appliance operates normally.

If the appliance is not programmed with an ID (Box 58), or the Appliance ID contained in the DE-PROGRAM signal does not match the programmed Appliance ID (Box 59), the appliance microprocessor ignores the DE-PROGRAM signal and reverts to the state of checking the status of the Mains Power Failure Flag and waiting for a Function signal from the transducer (Boxes 36, 37, and 38).

When the status of the Mains Power Failure Flag changes from 0 to 1 (Boxes 23, 28, or 36), indicating loss of mains power at the appliance, a check is initiated to determine whether movement of the appliance has been detected. (Box 61). During the absence of mains power, the microprocessor is powered by a battery which also powers the movement activated audible alarm. The status of the Mains Power Failure Flag is determined by the Mains Power Monitoring Continuous Routine depicted in FIG. 5F. Movement of the appliance is detected by means of a change of state of a movement detection switch installed in the appliance. If movement is detected (Box 61) the "Movement Detected" Flag is set to 1 (Box 62), and a check is carried out to determine whether the audible alarm is locked (Box 63). If the alarm is not locked, the audible alarm is then initiated.

The audible alarm sounds for 1 minute after initiation, or until it is silenced following the return of mains power at Box 22 in FIG. 5A. Immediately after initiation of the audible alarm, the status of the Mains Power Failure Flag is checked again (Box 65). If the Mains Failure Flag is still set to 1 indicating that mains power has not returned, the movement detector is checked again. If movement is detected, the audible alarm is re-initiated (Box 64) and the cycle repeats until mains power returns (Box 65 "No" response). Thus, the audible alarm sounds for 1 minute each time movement is detected, and sounds continuously if movement is continuous, or occurs at intervals of less than 1 minute. If movement is not detected during this cycle (Box 61 "No" response), the audible alarm is not initiated, or re-initiated. If the audible alarm is locked (Box 63 "Yes" response), initiation of the audible alarm cannot occur. When the status of the Mains Power Failure Flag changes from 1 to 0, indicating that mains power has returned (Box 65), the microprocessor executes the Security Routine (Box 20), since the Security System is in the programmed state (Box 2 "Yes" response).

Mains Power Monitoring Continuous Routine (FIG. 5F)

When mains power and battery power are applied (Box 1), and the Security System is programmed (Box 2 "Yes" response), the Mains Power Monitoring Continuous Routine is executed (Box 66). On application of power, the Count Timer and Pulse Counter are set to 0, and the Mains Power Failure Flag is set to 0 (Box 67). The microprocessor receives a continuous train of phase synchronisation pulses derived from the 50 Hz or 60 Hz AC mains voltage waveform, at the rate of one pulse per AC cycle. When a pulse is detected (Box 68), it is checked for minimum pulse length of 5 mS (Box 69) and, if greater than 5 mS, the pulse is counted by incrementing the pulse counter by 1 (Box 70). If the pulse length is less than 5 mS the pulse is not counted, and the microprocessor waits for the next pulse (Box 68).

When a pulse is counted (Box 70), or if no pulse was received (Box 68 "No" response), the elapsed time from the start of the count cycle is checked (Box 71) and, if less than the programmed count time of 500 mS, the microprocessor looks for the next pulse, and the count cycle continues.

When the count time is equal to or greater than the programmed count time of 500 mS (Box 71), the pulse counter is read (Box 72). If the number of pulses is greater than or equal to the expected minimum number of 20 pulses in the programmed time interval of 500 mS, mains power is deemed to be present. The Count Timer and the Pulse Counter are then both reset to 0 (Box 75), the "Mains Failure" Flag is set to 0 (Box 76), and the next count cycle commences (Box 68).

If the pulse count is less than the expected minimum number of 20 pulses (Box 72) in the programmed time interval of 500 mS (Box 71), mains power is deemed to have failed. The Count Timer and the Pulse Counter are then both reset to 0 (Box 73), the "Mains Power Failure" Flag is set to 1 (Box 74), and the next count cycle commences (Box 68). Hence the status of the "Mains Power Failure" Flag at any particular time indicates the status of mains power at the appliance. A flag status of 0 indicates that mains power is present, while a flag status of 1 indicates that mains power is not present.

"Receive" Phase Synchronisation Routine (FIG. 5G)

When the microprocessor is in the state of waiting for, or receiving a signal from the transducer, it "listens" to the AC line for part of each AC mains voltage cycle, in synchronism with the voltage waveform. This function is controlled by the "Receive" Phase Synchronisation Routine depicted in FIG. 5G.

The microprocessor receives a continuous train of phase synchronisation pulses derived from the 50 Hz or 60 Hz AC mains voltage waveform, at the rate of one pulse per AC cycle. These pulses are the same as those used for monitoring the status of AC mains power at the appliance, as described above under Mains Power Monitoring Continuous Routine (FIG. 5F).

The microprocessor detects the high—low transition at the trailing edge of each pulse (Box 77), and commences an 8 mS timing sequence (Boxes 78 and 79). When 8 mS have elapsed, the 8 mS timer is reset (Box 80) and a 6 mS timer is started (Box 81). While the 6 mS timer is running, any data received on the AC line is input to the microprocessor and stored (Box 82). When 6 mS have elapsed, the 6 mS timer is reset (Box 84) and the microprocessor checks whether the data (if any) comprises a complete signal (Main Program Boxes 11, 25, 30, or 38). Hence, data is only received between 8 mS and 14 mS after a pulse trailing edge.

If a complete signal has not been received, the microprocessor returns to the Main Program (Boxes 9, 23, 28 or 36) and the "Receive" Phase Synchronisation Routine will be executed again. This process is repeated until a complete signal is received, because the function signals transmitted by the transducer extend over more than one AC mains voltage cycle.

Referring now to FIGS. 6A to 6F, the manner in which the transducer software functions will now be described:

When mains power and battery power are applied (Box 1), if no PIN Code is stored in memory (Box 2) the microprocessor waits for a PIN Code to be entered manually from the keypad (Box 4). If a PIN code is stored in memory, and the Inhibit Transmission Flag is not set to 1 (Box 3) the Automatic Reset Routine is activated (Box 5) and a Reset signal is transmitted via the AC line. (The Automatic Reset Routine is depicted in FIG. 6E and described on page 22). The Inhibit Transmission Flag status is determined by the Mains Voltage Monitoring and Movement Detection Continuous Routine (Box 6) and is set to 1 if any physical movement of the transducer is detected during the absence of mains power, or if physical movement is detected for a pre-determined time when mains power is present. The battery provides power to the microprocessor to permit movement monitoring during the absence of mains power. (The Mains Voltage Monitoring and Movement Detection Continuous Routine is depicted in FIG. 6D and described on page 20).

If movement has not occurred during the absence of mains power, the Inhibit Transmission flag remains set to 0, and the Automatic Reset Routine is activated when mains power returns, to reset appliances which will have been disabled by the loss of mains power. When movement of the transducer is detected during the absence of mains power, the Inhibit Transmission Flag is set to 1, and therefore the Automatic Reset Routine is not activated when mains power returns. If movement of the transducer for a predetermined time is detected while mains power is present, the Inhibit Transmission Flag is also set to 1, so that any attempt to steal the transducer after connecting it to a portable source of AC. power in parallel with the mains will also prevent the subsequent transmission of automatic resetting signals. The Inhibit Transmission Flag is reset to 0 only after the correct PIN Code has been manually entered from the keypad (Box 28). These features are designed to prevent a stolen transducer from being used to reset stolen appliances having the same PIN Code as the transducer, by switching it "off" and "on" to activate its Automatic Reset Routine.

When a PIN Code is being entered from the keypad, and the ENTER button is not pressed within 30 seconds of the first digit entry (Box 7), a "Time Out" warning signal is generated (Box 8), and the microprocessor waits for another entry from the keypad. Hence uncompleted PIN Code entries are cancelled. If the PIN Code entered does not contain between 4 and 8 digits (Box 9), a "Wrong PIN" warning signal is given (Box 10) and the microprocessor waits for another keypad entry. If the next PIN Code entry contains the allowable number of digits, and a PIN Code is not already stored in memory (Box 11), a "Confirm PIN" warning signal is generated (Box 12) to prompt the owner to enter the PIN Code again to confirm the number. The microprocessor then waits for the confirming entry from the keypad (Box 13). When the confirming entry is received, the "Confirm PIN" warning signal is silenced (Box 14). The second PIN Code entry must be made within 30 seconds of the first entry (Box 15) and must match the first entry (Box 16) to be accepted. If not received within the 30 second time limit, a "Time Out" warning signal is generated (Box 8), and if no match occurs a "Wrong PIN" warning signal is generated (Box 17). In either case the process of entering and then confirming the PIN Code must be repeated.

When the PIN Code has been confirmed correctly, the microprocessor waits for a PROGRAM entry from the keypad (Box 18), which must be received within 30 seconds of the second PIN Code entry to be accepted (Box 19). When the PROGRAM entry is made within the allowable time limit, the PIN Code is encrypted using an encryption algorithm, and stored in protected memory in the microprocessor (Box 20). Encryption is used to prevent discovery of the PIN Code by recording and analysing transmissions from the transducer.

If the owner wishes to program the appliance with an optional identification number (ID), the ID must be entered within 5 seconds of the PROGRAM entry (Box 21). If no ID is entered within the 5 second time limit, a PROGRAM Command is transmitted with no Appliance ID (Box 22). If an ID is entered within the 5 second time limit, a PROGRAM Command is transmitted with the Appliance ID (Box 23). When transmission is completed, the microprocessor waits for another PIN Code entry from the keypad (Box 4). The purpose of the Appliance ID is to enable a Function command (other than RESET) to be directed to a specific appliance, if desired, when two or more appliances are controlled by the same transducer.

When a PIN Code is stored in memory (Box 11), all subsequent PIN Code entries from the keypad are checked to see whether they match the stored PIN Code (Box 24). If a match does not exist, a "Wrong PIN" counter is incremented by 1 (Box 25). If the "Wrong PIN" count does not equal 3 (Box 26), a "Wrong PIN" warning signal is generated (Box 10), and the microprocessor waits for another PIN Code entry from the keypad (Box 4). If the "Wrong PIN" count equals 3 (Box 26), indicating that three incorrect PIN Codes have been entered in succession, the microprocessor ignores any subsequent keypad entries for 1 hour (Box 27). This feature is provided to resist trial and error discovery of the PIN Code, ie. Entering a large number of trial PIN Codes until the correct PIN Code is found.

When the PIN Code entry does match the stored PIN Code (Box 24), the "Wrong PIN" counter is reset to 0 (Box 28), the "Inhibit Transmission" flag is reset to 0 (Box 28), and the microprocessor waits for a Function Command entry from the keypad (Box 28). The Function Command entry must be received within 30 seconds of the PIN Code entry to be accepted (Box 29), otherwise a "Time Out" warning signal is generated (Box 30) and the microprocessor waits for another PIN Code entry from the keypad (Box 4).

When the Function Command is received within 30 seconds of the PIN Code entry (Box 29), the microprocessor identifies the particular function command entry and initiates transmission of the corresponding function command as a coded signal via the AC power line.

If the Function Command entered is RESET (Box 31) a RESET Command is transmitted (Box 32). The purpose of the RESET Command is to enable the owner to restore appliances to the normal operational state when mains power has been restored following disconnection or failure of the mains power supply.

If the Function Command is PROGRAM (Box 33) a check is performed (Box 34) to determine whether or not the optional Appliance ID was entered within 5 seconds of the PROGRAM Command. If the ID is entered within the 5 second time limit, a PROGRAM Command including the ID is transmitted (Box 35), but if the ID is not entered within the 5 second time limit, a PROGRAM Command is transmitted with no Appliance ID (Box 36). The purpose of the PROGRAM Command is to enable the owner to program appliances with a PIN Code, and an appliance ID if desired, and thereby activate the Security System.

If the Function Command is LOCK (Box 37) a check is performed (Box 38) to determine whether or not the optional Appliance ID was entered within 5 seconds of the LOCK Command. If the ID is entered within the 5 second time limit, a LOCK Command including the ID is transmitted (Box 39), but if the ID is not entered within the 5 second time limit, a LOCK Command is transmitted with no Appliance ID (Box 40). The purpose of the LOCK Command is to enable the owner to lock an appliance in the disabled state to prevent its unauthorised use.

If the Function Command is UNLOCK (Box 41) a check is performed (Box 42) to determine whether or not the optional Appliance ID was entered within 5 seconds of the UNLOCK Command. If the ID is entered within the 5 second time limit, an UNLOCK Command including the ID is transmitted (Box 43), but if the ID is not entered within the 5 second time limit, an UNLOCK Command is transmitted with no Appliance ID (Box 44). The purpose of the UNLOCK Command is to restore a "locked" appliance to its normal operational state.

If the Function Command is LOCK ALARM (Box 45) a check is performed (Box 46) to determine whether or not the optional Appliance ID was entered within 5 seconds of the LOCK ALARM Command. If the ID is entered within the 5 second time limit, a LOCK ALARM Command including the ID is transmitted (Box 47), but if the ID is not entered within the 5 second time limit, a LOCK ALARM Command is transmitted with no Appliance ID (Box 48). The purpose of the LOCK ALARM Command is to enable the owner to lock the audible alarm in an appliance in the "off" state, so that the appliance can be disconnected from the mains power supply and moved without initiating the audible alarm.

When the Function Command is DE-PROGRAM (Box 49), a check is performed to determine whether the DE-PROGRAM button was held down for 5 seconds (Box 50). If the button is not held down for 5 seconds, the command is ignored and the microprocessor waits for another PIN Code entry from the keypad (Box 4). This feature is provided to reduce the risk of unintentional de-programming. If the DE-PROGRAM button was held down for 5 seconds, a further check is done to determine whether or not the optional Appliance ID was entered within 5 seconds of releasing the DE-PROGRAM button (Box 51). If the Appliance ID is entered within the 5 second time limit, a DE-PROGRAM Command including the Appliance ID is transmitted (Box 52). If the ID is not entered within the 5 second time limit, a DE-PROGRAM Command is transmitted with no Appliance ID (Box 53). After transmission of the DE-PROGRAM Command with no Appliance ID, the PIN Code is erased from memory within the microprocessor (Box 54). The PIN Code is not erased when a DE-PROGRAM Command with Appliance ID is transmitted, because only one appliance has been de-programmed and the PIN Code is still required to control other appliances. The purpose of the DE-PROGRAM Command is to enable the owner to erase the PIN Code, and Appliance ID (if applicable), from one or more appliances, and thereby de-activate the Security System. When changing a PIN Code, the DE-PROGRAM Command is followed by a PROGRAM Command containing the new PIN Code.

Mains Voltage Monitoring and Movement Detection Continuous Routine (Refer FIG. 6D)

Immediately after the application of mains power and battery power (Box 1), the Inhibit Transmission Flag is set to 1, the Mains Failure Flag is set to 0, the Count Timer is set to 0, the Pulse Counter is set to 0, the Movement Timer is set to 0, and the Movement Counter is set to 0 (Box 55). The microprocessor receives a continuous train of phase synchronisation pulses derived from the 50 Hz or 60 Hz AC mains voltage waveform, at the rate of one pulse per AC cycle. When a pulse is detected (Box 56), it is checked for minimum pulse length of 5 mS (Box 57) and, if greater than 5 mS, the pulse is counted by incrementing the pulse counter by 1 (Box 58). If the pulse length is less than 5 mS the pulse is not counted, and the microprocessor looks for the next pulse (Box 56).

When a pulse is counted (Box 58), or if no pulse was received (Box 56 "No" response), the elapsed time from the start of the count cycle is checked (Box 59) and, if less than the programmed count time of 500 mS, the microprocessor looks for the next pulse, and the count cycle continues.

When the count time is equal to or greater than the programmed count time of 500 mS (Box 59), the pulse counter is read (Box 60). If the number of pulses is greater than or equal to the expected number of 20 pulses in the programmed time interval of 500 mS, mains power is deemed to be present. The status of the Mains Failure Flag is then checked (Box 66) and if equal to 1 (indicating a transition from mains absent to mains present has occurred), the Mains Failure Flag is reset to 0, and the Count Timer and the Pulse Counter are both reset to 0 (Box 67). The microprocessor then returns to the main program, Refer FIG. 6A.

If the pulse count is less than the expected number of 20 pulses in the programmed time interval of 500 mS (Box 60), mains power is deemed to have failed. The Mains Failure Flag is then set to 1, the Count Timer is reset to 0, and the Pulse Counter is reset to 0 (Box 61). The movement detector output is then checked to determine whether movement has occurred (Box 62). If movement is detected, the "Inhibit Transmission" Flag is set to 1 (Box 63), and the status of the Movement Timer is checked (Box 64). If the Movement Timer is not running, the next count cycle commences (Box 56). If the Movement Timer is running, it is then halted and reset to 0, and the Movement Counter is also reset to 0 (Box 65) and the next count cycle commences (Box 56).

If the Mains Failure Flag is not equal to 1 (Box 66), and the Inhibit Transmission Flag is not equal to 1 (Box 79), the Count Timer and the Pulse Counter are both set to 0 (Box 68), and the output of the movement detector is checked (Box 69). If movement is detected (Box 69 "Yes" response), the Movement Counter is incremented by 1 (Box 70), and the status of the Movement Timer is checked (Box 71). If the timer is running the elapsed time is checked (Box 73). If the timer is not running, it is started (Box 72), and the elapsed time is also checked (Box 73). If the elapsed time is 20 seconds or more (Box 73 "Yes" response), the Movement Counter is checked (Box 74). If the movement count is 10 or more, the Inhibit Transmission Flag is set to 1 (Box 75) the Movement Timer is halted and reset to 0, and the Movement Counter is reset to 0 (Box 76), and the monitoring cycle continues. If the movement count is not 10 or more (Box 74), the Movement Timer is halted and reset to 0, the Movement Counter is also reset to 0 (Box 76) and the monitoring cycle continues. If movement is not detected (Box 69 "No" response) and the Movement Timer is not running (Box 77 "No" response) the monitoring cycle continues. If the Movement Timer is running (Box 77 "Yes" response) and the elapsed time is 20 seconds or more (Box 78 "Yes" response) the Movement Timer is halted and reset to 0 and the Movement Counter is also reset to 0 (Box 76) and the monitoring cycle continues. If the elapsed time is not more than 20 seconds (Box 78 "No" response) the monitoring cycle continues. Hence, movement is monitored in 20 second periods, and if more than 10 movement events are detected in a 20 second period while mains power is present, the automatic reset function is inhibited. This feature is provided to prevent defeat of the automatic reset inhibit function by the connection of a portable source of AC power to the transducer, in parallel with the mains supply, prior to removing the transducer from its authorised location.

If the Inhibit Transmission Flag is set to 1 (Box 79 "Yes" response), the movement monitoring sequence depicted by Boxes 68 to 78 is bypassed, but the mains voltage monitoring cycle continues. This is because there is no need to monitor movement of the transducer when the inhibit Transmission Flag has already been set to 1 by movement. The Inhibit Transmission Flag can only be reset to 0 by manually entering the correct PIN Code when mains power is present (Refer FIG. 6A, Box 28).

Automatic Reset Routine (Refer FIG. 6E)

The Automatic Reset Routine is activated immediately after the application of mains power (Box 1), if the "Inhibit Transmission" flag is not set to 1 (Box 3). The purpose of this routine is to automatically reset appliances when mains power returns following a power failure. The "Inhibit Transmission" flag is set to 1 if movement of the transducer has occurred during the absence of mains power. Hence, if the transducer is removed by a thief, it cannot be used to reset stolen appliances at another location by plugging it in and switching it on. A "Line Listening" circuit provides a signal to the microprocessor, which indicates whether or not there is noise or interfering signals on the AC line. This signal is used, as described below, to ensure that if the line is noisy, the microprocessor will wait for a quiet period before transmitting RESET Commands.

When the Automatic Reset Routine is entered, the Cycle Counter and Auto Reset Counter are set to 0 (Box 80). The output of the "Line Listening" circuit is checked (Box 81) and, if the line has been quiet for a period of 500 ms, a RESET Command is transmitted (Box 82). The Auto Reset Counter is then incremented by 1 (Box 83) and the counter is read (Box 84). If the count is not equal to 4, the line is checked again (Box 81) and, if quiet, another RESET Command is transmitted (Box 82), and the cycle repeats. While the line remains quiet, the cycle repeats until the Auto Reset count equals 4 (Box 84), after which the Auto Reset counter is reset to 0 (Box 85), and the microprocessor waits for a PIN Code entry from the keypad (Box 4).

When the output of the "Line Listening" circuit indicates that the line is not quiet (Box 81 'No' response), the microprocessor waits for a random time interval of 1s–5s (Box 86), and increments the Cycle Counter by 1 (Box 87). The Cycle Counter is then read (Box 88) and, if the cycle count is not equal to 20, the microprocessor checks the output of the "Line Listening" circuit again. If the line is not quiet, the cycle repeats until either, a quiet period is detected and the "transmit loop" is entered (Boxes 81 to 85), or the cycle count equals 20 (Box 88). If the cycle count equals 20, the Cycle Counter is reset to 0 (Box 89), a "Line Busy" signal is generated (Box 90), and the microprocessor waits for a PIN Code entry from the keypad (Box 4).

Transmit Phase Synchronisation Routine (Refer FIG. 6F)

The Transmit Phase Synchronisation Routine is activated during transmission of function commands. (ie. Boxes 22,23,32,35,36,39,40,43,44,47,48,52, and 53). This routine ensures that each pulse in the output pulse train is synchronised with the AC mains voltage waveform, so that transmission occurs at the appropriate point in each AC cycle. Transmission occurs at the rate of one pulse per AC cycle.

The microprocessor receives a continuous train of phase synchronisation pulses derived from the 50 Hz or 60 Hz AC mains voltage waveform, at the rate of one pulse per AC cycle. These pulses are the same as those used for monitoring the status of AC mains power at the transducer, as described above under Mains Voltage Monitoring and Movement Detection Continuous Routine.

The microprocessor detects the high—low transition at the trailing edge of each pulse (Box 91), and commences a 4 mS timing sequence (Boxes 92 and 93). When 4 mS have elapsed, the 4 mS timer is reset (Box 94) and a 12 mS timer is started (Box 95). While the 12 mS timer is running, the 135 kHz signal containing an output pulse is transmitted (Box 96). When 12 mS have elapsed, the 12 mS timer is reset and the 135 kHz signal is stopped (Box 98). Hence each data pulse is transmitted between 4 mS and 16 mS after a pulse trailing edge. This routine is repeated for each data pulse until the function command is complete.

The software providing the above described functions preferably incorporates suitable security encryption.

This will be achieved by:
1. The implementation of encryption techniques, suitable for a microprocessor environment, with sufficient sophistication to make discovery of the PIN code by reading coded transmissions effectively impossible.
2. Utilisation of rolling codes and other techniques, suitable for a microprocessor environment, to prevent access to the system by transmitting recordings of authorised commands, and to include multiple receivers driven by a single "transducer" ensuring that it is possible to take a receiver out of the loop and re-introduce it without upsetting the "rolling code" and other coding systems.
3. The utilisation of techniques for preventing unauthorised external interrogation of data stored in non-volatile memory of a microprocessor, whilst allowing authorised interrogation.
4. Implementation techniques for changing the security parts of the software in the event of a software leak.

The invention claimed is:

1. A device for deterring theft of an electrical or like appliance having an operation controlling microprocessor, including signal receiving means connected to the microprocessor and adapted for connection to a power supply, first programmed means enabling the appliance microprocessor to disable the appliance, second programmable means including a microprocessor controlled signal generating means for generating setting and resetting signals for transmission to the receiving means, said setting signals operating to enable the first programmed means to render the appliance inoperable when power to the appliance is disconnected, said resetting signal operating to reset the microprocessor to an appliance operative state, said second programmable means being programmed to include an automatic reset routine which is activated by the restoration of power to the appliance following a power failure event to send a said resetting signal to the appliance microprocessor to reset the microprocessor to an appliance operative state whereby automatic resetting occurs in the event of a power failure event.

2. The device of claim 1 further including motion sensing means associated with the signal receiving means for detecting movement of the appliance.

3. The device of claim 2, wherein the motion sensing means is associated with an alarm circuit controlled by the appliance microprocessor to activate the alarm circuit in the event that power to the appliance is disconnected and the appliance is moved, as in the case of theft of the appliance.

4. The device of claim 1, wherein the second programmable means includes a motion sensing means operable to disable the signal generating means in the event that the second programmable means is moved while power supply to the appliance is disconnected, or if movement occurs for a predetermined time while power supply is connected.

5. The device of claim 1, wherein the second programmable means is adapted for connection to a power outlet of a mains power supply to which one or more appliances having said signal receiving means are connected whereby signals generated by said signal generating means can be transmitted via the power supply to set and reset the appliance microprocessors of said one or more appliances.

6. The device of claim 1, wherein the programmed and/or programable means is protected by suitable encryption devices or means.

7. The device of claim 1, wherein the setting/resetting signal is sent via the power supply plug to the appliance.

8. The device of claim 1, wherein said second programmable means further including security code inputting means to enable user resetting of the appliance microprocessor when required.

9. The device of claim 1, wherein said second programmable means is separate from the appliance.

* * * * *